(12) United States Patent
Malhotra et al.

(10) Patent No.: US 12,539,667 B2
(45) Date of Patent: Feb. 3, 2026

(54) MULTIPLEXED 3D PRINTING

(71) Applicant: Rutgers, The State University of New Jersey, New Brunswick, NJ (US)

(72) Inventors: Rajiv Malhotra, Rahway, NJ (US); Jeremy Cleeman, New Brunswick, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 113 days.

(21) Appl. No.: 18/709,303

(22) PCT Filed: Nov. 14, 2022

(86) PCT No.: PCT/US2022/079782
§ 371 (c)(1),
(2) Date: May 10, 2024

(87) PCT Pub. No.: WO2023/086976
PCT Pub. Date: May 19, 2023

(65) Prior Publication Data
US 2025/0001681 A1 Jan. 2, 2025

Related U.S. Application Data

(60) Provisional application No. 63/263,981, filed on Nov. 12, 2021.

(51) Int. Cl.
*B29C 64/118* (2017.01)
*B29C 64/194* (2017.01)
*B29C 64/209* (2017.01)
*B29C 64/295* (2017.01)
*B29C 64/321* (2017.01)
(Continued)

(52) U.S. Cl.
CPC .......... *B29C 64/209* (2017.08); *B29C 64/118* (2017.08); *B29C 64/194* (2017.08); *B29C 64/295* (2017.08); *B29C 64/321* (2017.08); *B29C 64/393* (2017.08); *B33Y 10/00* (2014.12);
(Continued)

(58) Field of Classification Search
CPC .... B29C 64/118; B29C 64/386; B29C 64/393
See application file for complete search history.

(56) References Cited

U.S. PATENT DOCUMENTS 10,974,299 B2 * 4/2021 Bauer .................... B22F 12/53
10,981,330 B2 * 4/2021 Susnjara ............... B29C 64/118
(Continued)

OTHER PUBLICATIONS

Chesser, P., et al., "Extrusion control for high quality printing on Big Area Additive Manufacturing (BAAM) systems", Additive Manufacturing, vol. 28, 2019, pp. 445-455.
(Continued)

*Primary Examiner* — Atul P. Khare
(74) *Attorney, Agent, or Firm* — Wolter Van Dyke DAvis, PLLC; Eugene J. Molinelli; Patrick D. Herron

(57) ABSTRACT

A multiplexed three-dimensional printing system including a printhead block (100) moveable in three-dimensions, the printhead block including a plurality of extruders (101, 103, 105), wherein each of the plurality of extruders is individually switchable between a deposition state and a retraction state, wherein the deposition state deposits a printing material, and wherein the retraction state prevents deposition of the printing material.

19 Claims, 27 Drawing Sheets

(51) Int. Cl.
*B29C 64/393* (2017.01)
*B33Y 10/00* (2015.01)
*B33Y 30/00* (2015.01)
*B33Y 40/00* (2020.01)
*B33Y 50/02* (2015.01)
*B33Y 80/00* (2015.01)

(52) U.S. Cl.
CPC ............... *B33Y 30/00* (2014.12); *B33Y 40/00* (2014.12); *B33Y 50/02* (2014.12)

(56) References Cited

U.S. PATENT DOCUMENTS

| | | |
|---|---|---|
| 11,571,852 B2 * | 2/2023 | Holland ................. B29C 64/209 |
| 2014/0120194 A1 | 5/2014 | Swanson et al. |
| 2017/0190109 A1 * | 7/2017 | Holland ................. B33Y 50/02 |
| 2019/0283329 A1 | 9/2019 | Lensgraf et al. |
| 2020/0198234 A1 * | 6/2020 | Kuster ................. B29C 64/393 |
| 2021/0070031 A1 | 3/2021 | Debora et al. |

OTHER PUBLICATIONS

International Preliminary Report on Patentability received for PCT Patent Application No. PCT/US2022/079782, mailed on May 23, 2024, 8 pages.
International Search Report and Written Opinion received for PCT Patent Application No. PCT/US2022/079782, mailed on Feb. 14, 2023, 8 pages.

* cited by examiner

MULTIPLEXED 3D PRINTING

CROSS-REFERENCES TO RELATED APPLICATION

This application claims priority to PCT Application No. PCT/US22/79782, filed Nov. 14, 2022, which This application claims the benefit of U.S. Provisional Patent Application No. 63/263,981, filed Nov. 12, 2021, which is incorporated by reference herein in its entirety.

BACKGROUND

Three-dimensional (3D) printing or additive manufacturing uses computer-controlled sequential layering of materials in lines to create two-dimensional (2D) layers and sequential addition of layers to make 3D objects in an additive fashion. The materials are often polymers or composites. 3D printing has shown significant potential for reductions in the energy, cost and material usage in fabrication processes while allowing new structural designs that enable novel part functionality.

The global additive manufacturing market is expected to reach USD 26.68 billion by 2027, growing at a high rate of 14.4%, according to a new report by Reports and Data. Existing additive manufacturing products include Big Area Additive Manufacturing, Fused Filament Fabrication, Binder Jet Printing, Direct Ink Writing, polymer selective laser sintering, polymer selective laser melting.

Traditionally, 3D printing has been confined to smaller parts, having a scale of a few inches for niche applications. However, recent demonstrations have evinced considerable interest in making very large structures, including structures on a multimeter scale. Large multimeter sized polymer and polymer composite structures have significant applications in the aerospace, automotive, construction and manufacturing industries. 3D printing of such structures can realize massive savings in materials cost and enable new capabilities in design and functionality of such structures that are not possible by conventional manufacturing techniques. The only extant 3D printing process capable of making such large structures is the Material Extrusion (MatEx) based Big Area Additive Manufacturing (BAAM) process that was developed by Oak Ridge National Laboratory in around 2014. BAAM can be performed without a powder bed or a polymer vat, which is crucial for making large structures in an economically feasible and safe manner. The key difference between BAAM and conventional MatEx processes is as follows. While both BAAM and conventional MatEx processes are based on extrusion of molten polymer from a nozzle that is programmed to move along a desired 3D path, conventional MatEx requires infeasibly long fabrication time for large structures. This is due to the low deposition rate in MatEx since the nozzle diameter is small ($\approx$0.4 mm, and proportional to the line width) and the layer height is also small ($\approx$0.02-0.4 mm). BAAM overcomes this critical issue by increasing the layer height by nearly 100× and increasing the nozzle diameter and line width by nearly 10×14, thus increasing the material deposition rate and process throughput by nearly 1000× as compared to conventional MatEx.

While the increase in layer height (h) and line width (w) in BAAM does allow feasible fabrication time with additive manufacturing, it also has several drawbacks. First, it results in a greater line width (w) and layer height (h) of the deposited material, which inherently reduces the geometric resolution in the planar and build directions respectively. This is due to the stair-step effect which manifests in both the planar and vertical directions when using large width (w) and height (h). Secondly, greater height (h) naturally increases the roughness of the surface by creating large scallops on the surface due to the stair-step effect. A common approach to tackling this issue is to machine the surface of the part after additive manufacturing. Since the amount of material removed and wasted during such machining is directly proportional to height (h), the 100× increase in height (h) in BAAM results in 100× greater material wastage as compared to conventional MatEx. Thirdly, the large planar size of the part and the fact that a single nozzle is used for deposition, causes higher spatial temperature gradients in the part in the planar direction. This increases the tendency for out-of-plane warpage of the part during fabrication. Since the printed lines are bigger, they undergo non-uniform internal cooling and retain significantly more heat for orders of magnitude greater time than conventional MatEx. As more layers are deposited on top of this line it continues to retain heat, often at magnitudes greater than the glass transition temperature of the polymer, which can cause sagging of the part in the build direction. As a result, the ability to fabricate overhanging parts is dependent on the local part geometry, which often limits the geometric complexity to prismatic structures or requires changes in the design of the part itself. While reducing the nozzle speed can alleviate this issue, this comes at the cost of reduced mechanical properties due to lesser inter-layer and intra-layer bonding, since the polymer has cooled down too much and enough thermal energy is not available for sufficient reptation across the polymer interfaces. When creating composite parts using BAAM for structural applications (usually chopped carbon fiber inclusion), the non-uniform distribution of carbon fibers inside each line causes significant reductions in the strength of BAAM-fabricated parts.

Existing methods for increasing stiffness and/or strength of 3D printed parts include ultrasonic methods, plasma treatment methods, and local thermal heating methods. Each of these methods suffers from one or more drawbacks. Ultrasonic methods only achieve a modest increase in strength. Plasma treatment methods need 10s of kV of voltage and are electrically infeasible over large areas even on the scale of a few inches. Local thermal heating using lasers or hot guns is prone to causing warping of the printed bead.

A need, therefore, exists for 3D printing of the above large structures with better geometric resolution, less surface roughness, better stiffness, better strength, greater geometric complexity, all while maintaining a similar fabrication time as the state-of-the-art BAAM process.

BRIEF DESCRIPTION OF THE FIGURES

Many aspects of this disclosure can be better understood with reference to the following figures.

DETAILED DESCRIPTION

Introduction and Definitions

Figure 1A:
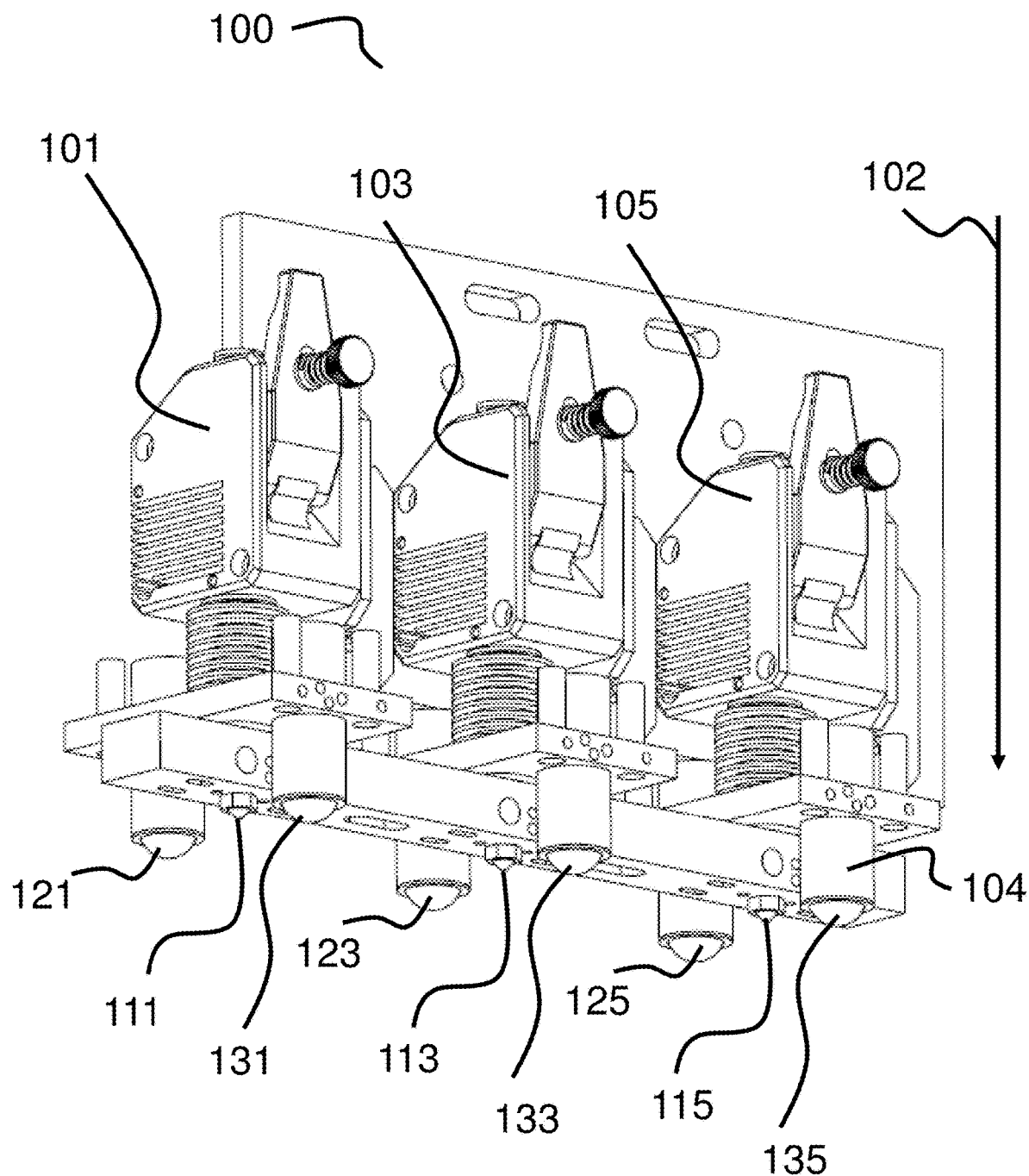
FIG. 1A is an example according to various embodiments, illustrating multiplexing printhead block having a plurality of extruders.

This disclosure is written to describe the invention to a person having ordinary skill in the art, who will understand that this disclosure is not limited to the specific examples or embodiments described. The examples and embodiments are single instances of the invention which will make a much larger scope apparent to the person having ordinary skill in the art. Unless defined otherwise, all technical and scientific terms used herein have the same meaning as commonly understood by the person having ordinary skill in the art. It is also to be understood that the terminology used herein is for the purpose of describing examples and embodiments only, and is not intended to be limiting, since the scope of the present disclosure will be limited only by the appended claims.

All the features disclosed in this specification (including any accompanying claims, abstract, and drawings) may be replaced by alternative features serving the same, equivalent, or similar purpose, unless expressly stated otherwise. Thus, unless expressly stated otherwise, each feature disclosed is one example only of a generic series of equivalent or similar features. The examples and embodiments described herein are for illustrative purposes only and that various modifications or changes in light thereof will be suggested to the person having ordinary skill in the art and are to be included within the spirit and purview of this application. Many variations and modifications may be made to the embodiments of the disclosure without departing substantially from the spirit and principles of the disclosure. All such modifications and variations are intended to be included herein within the scope of this disclosure. For example, unless otherwise indicated, the present disclosure is not limited to particular materials, reagents, reaction materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

All numeric values are herein assumed to be modified by the term "about," whether or not explicitly indicated. The term "about" generally refers to a range of numbers that one of skill in the art would consider equivalent to the recited value (for example, having the same function or result). In many instances, the term "about" may include numbers that are rounded to the nearest significant figure.

In everyday usage, indefinite articles (like "a" or "an") precede countable nouns and noncountable nouns almost never take indefinite articles. It must be noted, therefore, that, as used in this specification and in the claims that follow, the singular forms "a," "an," and "the" include plural referents unless the context clearly dictates otherwise. Thus, for example, reference to "a support" includes a plurality of supports. Particularly when a single countable noun is listed as an element in a claim, this specification will generally use a phrase such as "a single." For example, "a single support."

In this specification and in the claims that follow, reference will be made to a number of terms that shall be defined to have the following meanings unless a contrary intention is apparent.

As used herein, the term "standard temperature and pressure" generally refers to 25° C. and 1 atmosphere. Standard temperature and pressure may also be referred to as "ambient conditions." Unless indicated otherwise, parts are by weight, temperature is in ° C., and pressure is at or near atmospheric. The terms "elevated temperatures" or "high-temperatures" generally refer to temperatures of at least 100° C.

Unless otherwise specified, all percentages indicating the amount of a component in a composition represent a percent by weight of the component based on the total weight of the composition. The term "mol percent" or "mole percent" generally refers to the percentage that the moles of a particular component are of the total moles that are in a mixture. The sum of the mole fractions for each component in a solution is equal to 1.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both limits, ranges excluding either or both of those included limits are also included in the disclosure.

As used herein, the term "disposed on" refers to a positional state indicating that one object or material is arranged in a position adjacent to the position of another object or material. The term does not require or exclude the presence of intervening objects, materials, or layers.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by prior disclosure. Further, the dates of publication provided could be different from the actual publication dates that may need to be independently confirmed.

General Discussion

Various embodiments provide a multiplexed 3D printing (Multi3D) system and method suitable for large structures with 10-100× enhancement in geometric resolution and surface roughness, 3× greater stiffness and strength, greater geometric complexity via inherent mitigation of in-process sagging, and similar fabrication time as the state-of-the-art Big Area Additive Manufacturing process.

In multiplexed 3D printing according to various embodiments the nozzle diameter and layer height can be as low as conventional MatEx. But since multiple sections of the part are being fabricated at the same time, the throughput can be increased to equal or potentially even exceed that of BAAM by simply adding more nozzles. BAAM can extrude at a rate of about 36 kg/hr. Commercially available Multiplexed 3D printing according to various embodiments nozzles can extrude at a rate of about 1 kg/hr while extruding a 1 mm line width for layer heights of 0.5 mm or less. Thus, a 6×6 array of such nozzles can enable as high a throughput as BAAM while increasing the geometric resolution by nearly 8×. These nozzles can be mounted on the same gantry, i.e., 36 additional gantries or robots are not required. This breaks the tradeoff between resolution and throughput which plagues both conventional Fused Filament Fabrication (FFF) and BAAM. For example, the protrusions shown in FIG. 16A would not be possible with BAAM since its line width would be greater than the width of the protrusions. Since the layer height is about 100× lesser in Multi3D, the resulting wastage of polymer/composite material during post-additive machining of the surface is reduced by about 100×.

There is no fundamental restriction on how large the part can be or how high the speed can go. The total extrusion/polymer deposition rate depends on the extrusion/polymer deposition rate of each nozzle multiplied by the number of nozzles. For example, if commercially available high-rate nozzles capable of depositing up to 200 mm$^3$/s are used, then a 5×5 nozzle array would yield a total deposition rate of 5000 mm$^3$/s. Similarly, a 10×10 array would yield 20000 mm$^3$/s and a 20×20 array would yield 80000 mm$^3$/s. The part size depends on the size of the workspace of the gantries on which the nozzles are mounted. Depending on the application and need, the commercially available forms of such gantries can reach the size of the wing of an airplane, a 1-bedroom apartment in NJ, a 5-foot×10 foot×4-foot tabletop router, or a small router available from Amazon for hobby purposes.

The above advantages have been demonstrated for Multiplexed 3D printing according to various embodiments of complex objects (See: Examples presented herein). Note that the dynamic on-off operation of the nozzles and the scanning motion of the gantry during Multiplexed 3D printing according to various embodiments are significant departures from conventional MatEx and BAAM. Without these innovations multiplexed 3D printing according to various embodiments can only create repeating structures and cannot achieve the complexity in planar geometry demonstrated in the Examples presented herein, for example in FIGS. 16A-C.

In multiplexing 3D printing systems and methods according to various embodiments, the interface between subsections made by different nozzles is weaker than the bulk material. This is because of the unique temperature history imposed by the distinctive toolpath used, in which a deposited line at an interface may be allowed to cool down significantly before the corresponding line in the adjacent subsection is deposited, and because smaller lines cool down much faster than larger lines due to greater surface area per unit volume. This cooling should result in lesser bonding, stiffness, and strength for multiplexed 3D printing according to various embodiments than BAAM, especially in the direction perpendicular to the deposited lines. However, as demonstrated in the Examples presented herewith, the stiffness and the strength with multiplexed 3D printing according to various embodiments are greater than or similar to that in BAAM. The use of the hot-roller further increases the stiffness and strength, despite the weakest location still being the subsection interfaces. These mechanical properties are for the direction in which BAAM parts are usually the weakest, i.e., perpendicular to the line direction. As used herein, the term "line direction" refers to the axis along which polymer material is deposited, for example, from a nozzle to form a line, a course, or a row of the material. Further, when using carbon fiber reinforced composites in BAAM a typical issue is the formation of a carbon fiber skin inside the printed line that causes reduced bonding and mechanical strength. This issue is absent in the smaller beads used in the multiplexed 3D printing systems and methods according to various embodiments.

At any given instant during multiplexing 3D printing according to various embodiments, the use of greater number of nozzles simultaneously printing the polymer increases the number of distributed heat sources acting on the previously built polymer structure. This can reduce the thermal gradients in the structure and reduces the warping of the part. Due to the smaller width (w) and height (h) the deposited lines also cool down by orders of magnitude faster than in BAAM, so that sagging is avoided. As a result, Multiplexed 3D printing according to various embodiments can create structures with overhangs and with both complex planar geometries and overhangs, indicating that truly 3D structures are possible. See the Examples presented herewith, particularly with respect to FIGS. 16F and 16G regarding structures with overhangs.

Multiplexed 3D printing according to various embodiments machines can be assembled from widely available high-throughput filament extruders. However, BAAM requires customized screw extrusion systems. While there are commercial vendors who offer similar pellet-fed extruders, the availability of high-throughput extrusion systems and material handling is limited to one or two vendors and may have a high cost for entire systems. On the other hand, each multiplexed 3D printing system according to various embodiments extruder costs significantly less for meeting the same throughput as BAAM. Thus, multiplexed 3D printing systems and methods according to various embodiments can increase low-cost and easier adoption of large-area 3D printing for various applications.

Various embodiments relate to a 3D printing technique with multiple nozzles. Existing BAAM 3D printers use a single large nozzle with a high material flow rate to overcome the low speed of 3D printing, and it requires larger layer heights and leads to poor geometry and properties as compared to conventional 3D printing with smaller material flow rates. Various embodiments presented herewith use multiple smaller nozzles in a large array to concurrently print different sections of the structure at the same time. It also implies a dynamic on-off operation of the nozzles and a unique scanning motion of the gantry, which enables the printing of complex structures, such as protrusions and overhanging structures. In addition, each nozzle according to various embodiments may be equipped with one or more passive rollers that are spring-loaded, weighted, and/or internally heated. As soon as the polymer is deposited by a nozzle, the corresponding roller passes over this just-deposited material and in-situ heats and compresses it. This heating and compression may fill voids between adjacent lines and previous layers.

FIG. 1A is an example according to various embodiments, illustrating multiplexing printhead block having a plurality of extruders. The multiplexing printhead block 100 may include any number of extruders. For example, the multiplexing printhead block 100 may include a first extruder 101, a second extruder 103, and a third extruder 105. The first extruder 101 may direct a molten polymer filament through a first print nozzle 111. The first print nozzle 111 may be positioned between a plurality of rollers. For example, the first print nozzle 111 may be positioned between a first roller 121 and a second roller 131. Similarly, the second extruder 103 may direct a molten polymer filament through a second print nozzle 113. The second print nozzle 113 may be positioned between a plurality of rollers. For example, the second print nozzle 113 may be positioned between a third roller 123 and a fourth roller 133. Finally, the third extruder 105 may direct a molten polymer filament through a third print nozzle 115. The third print nozzle 115 may be positioned between a plurality of rollers. For example, the third print nozzle 115 may be positioned between a fifth roller 123 and a sixth roller 133. The rollers, including but not limited to the first roller, the second roller, the third roller, the fourth roller, the fifth roller, and the sixth roller may be any suitable type of roller, such as, for example, a bearing-type roller as illustrated. The rollers may also be cylindrical wheel-type rollers as shown in FIG. 4B. The rollers may be spring-loaded. A spring-loaded roller may be configured to urge the roller in a downward direction along an axis 102, representing a direction of polymer flow through the extruders 101, 103, 105 and a direction of polymer deposition from the nozzles 111, 113, 115. The rollers may be heated via a heating element within a roller housing, such as roller housing 104 annotated with respect to the sixth roller 135.

Figure 1B:
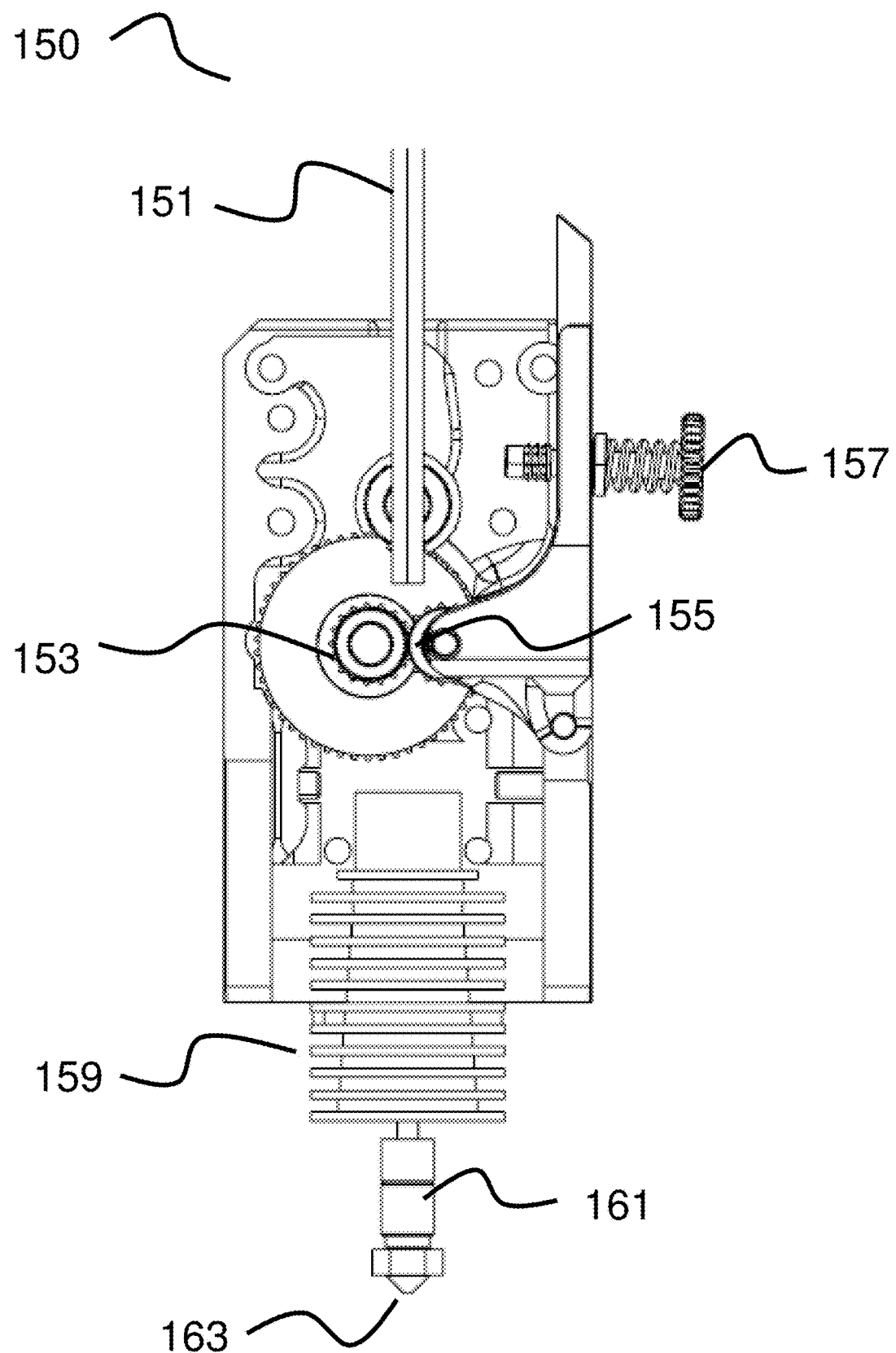
FIG. 1B is an example according to various embodiments, illustrating a cross-sectional view of a single extruder assembly.

FIG. 1B is an example according to various embodiments, illustrating a cross-sectional view of a single extruder assembly. The extruder assembly 150 may be configured to accept a polymer filament 151. The polymer filament 151 may pass between a filament gear 153 and a filament roller 155, which cooperate to pull the polymer filament 151 into the extruder assembly 150 and to urge the polymer filament 151 toward the nozzle 163. The distance between the filament gear 153 and the filament roller 155 may be adjusted via a tensioner 157, which may be configured to urge the filament roller 155 toward the filament gear 153. Adjusting the distance between the filament gear 153 and the filament roller 155 may serve to provide a better grip on the polymer filament 151. After passing between the filament gear 153 and the filament roller 155, the polymer filament 151 passes through heat sink 159, through heated block 161, and finally through nozzle 163 for deposition.

Figure 2:
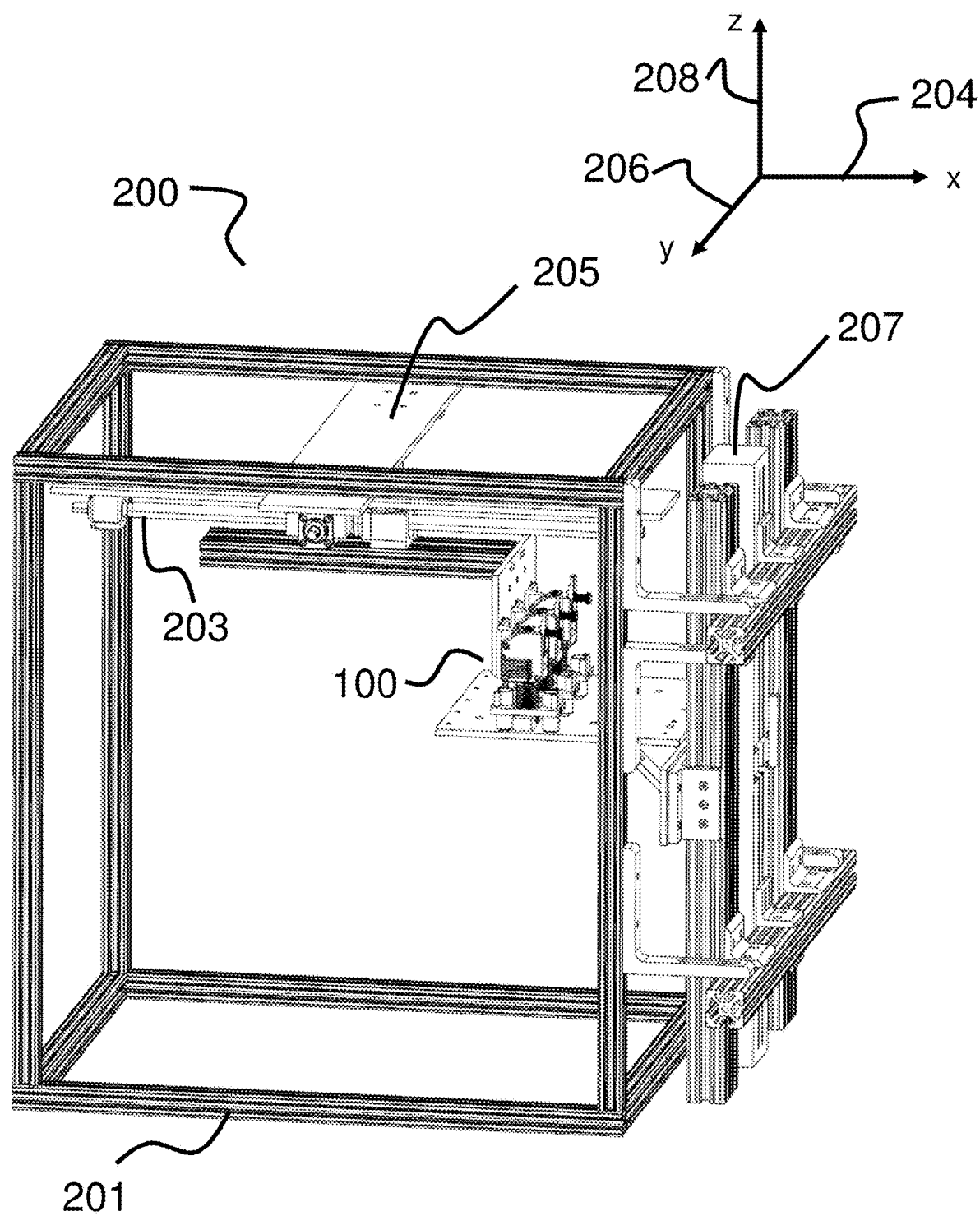
FIG. 2 is an example according to various embodiments, illustrating a multiplexed 3D printing system comprising the multiplexing printhead block from FIG. 1A in association with a three-dimensional printing gantry.

FIG. 2 is an example according to various embodiments, illustrating a multiplexed 3D printing system 200 comprising the multiplexing printhead block 100 from FIG. 1A in association with a three-dimensional printing gantry 201. The gantry 201 may include an x-axis track 203 configured to allow the multiplexing printhead block 100 to translate along an x-axis 204; a y-axis track 205 configured to allow the multiplexing printhead block 100 to translate along a y-axis 206; and a z-axis track 207 configured to allow the multiplexing printhead block 100 to translate along a z-axis 208. The multiplexed 3D printing system 200 may further include means for translating the multiplexing printhead block 100 along the x-axis track 203, the y-axis track 205, and/or the z-axis track 207.

Figure 3:
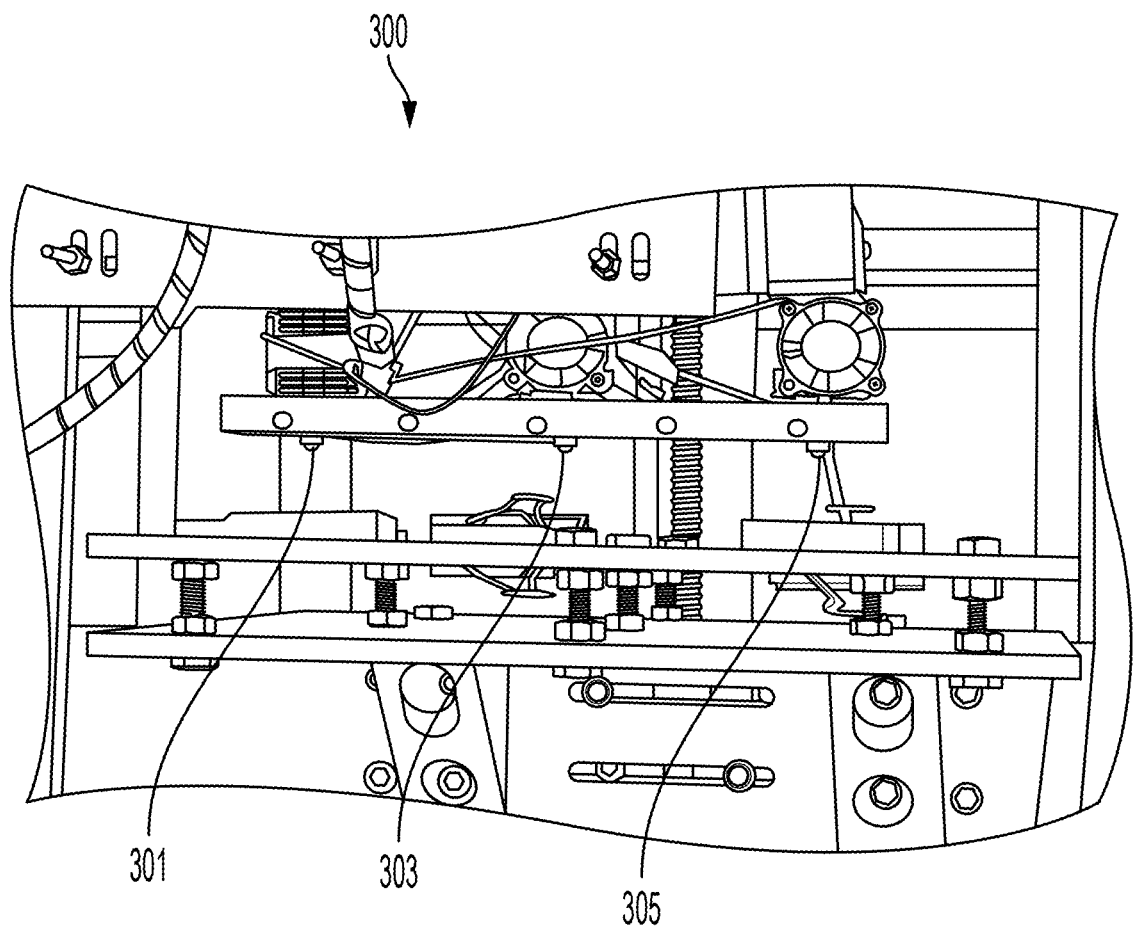
FIG. 3 is an example according to various embodiments, illustrating a photograph of a preliminary fabricated prototype of a multiplexing printhead block including a plurality of extruders.

FIG. 3 is an example according to various embodiments, illustrating a photograph of a preliminary fabricated prototype of a multiplexing printhead block including a plurality of extruders. For example, the multiplexing printhead block 300 may include a first extruder 301, a second extruder 303, and a third extruder 305. While this initial prototype has been developed for 3 nozzles, extension of this approach to multiple nozzles is relatively straightforward.

Figure 4A:
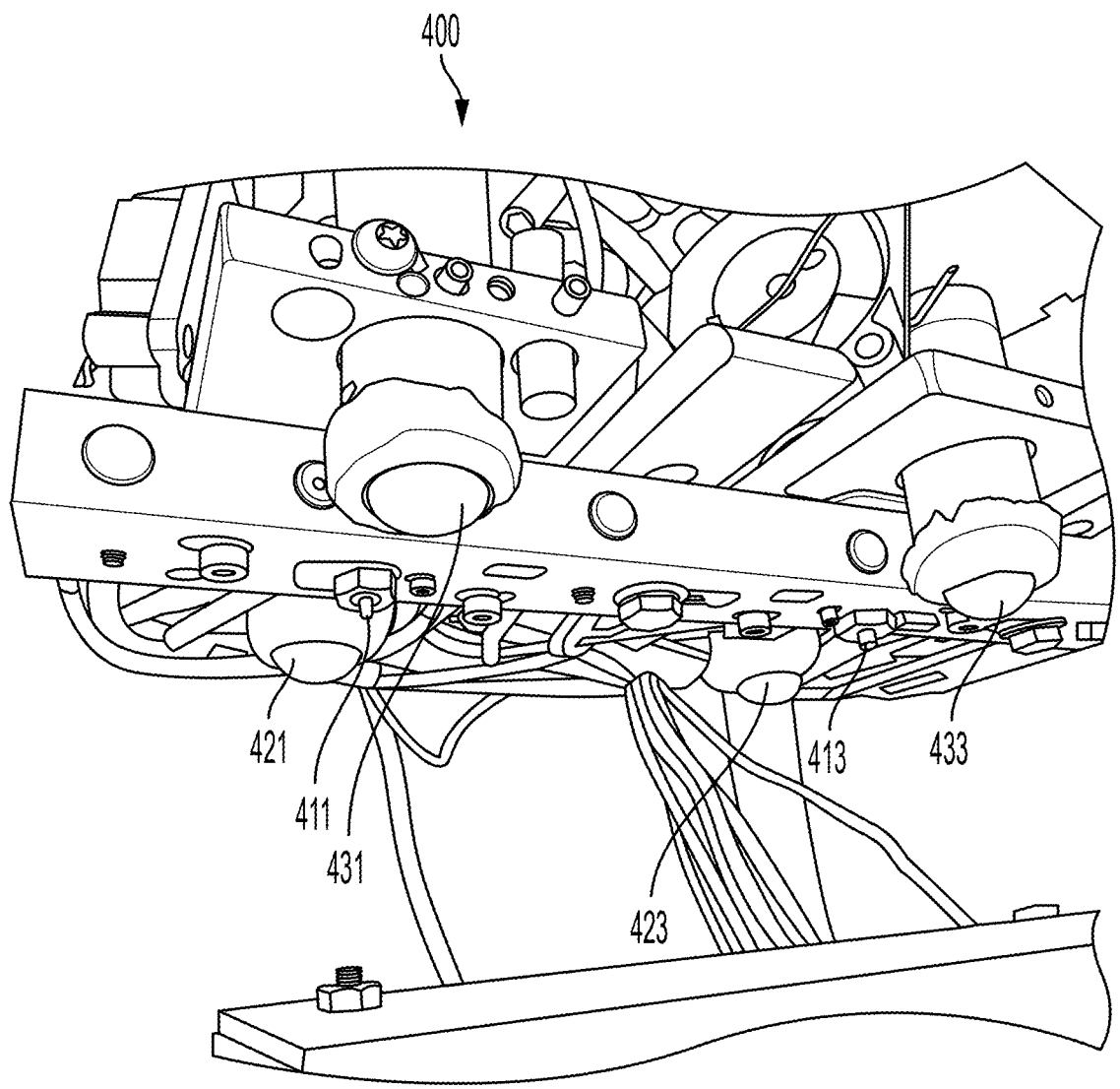
FIG. 4A is an example according to various embodiments, illustrating a photograph of a preliminary fabricated prototype of a multiplexing printhead block including a plurality of extruders positioned between a plurality of bearing-style rollers.
Figure 4B:
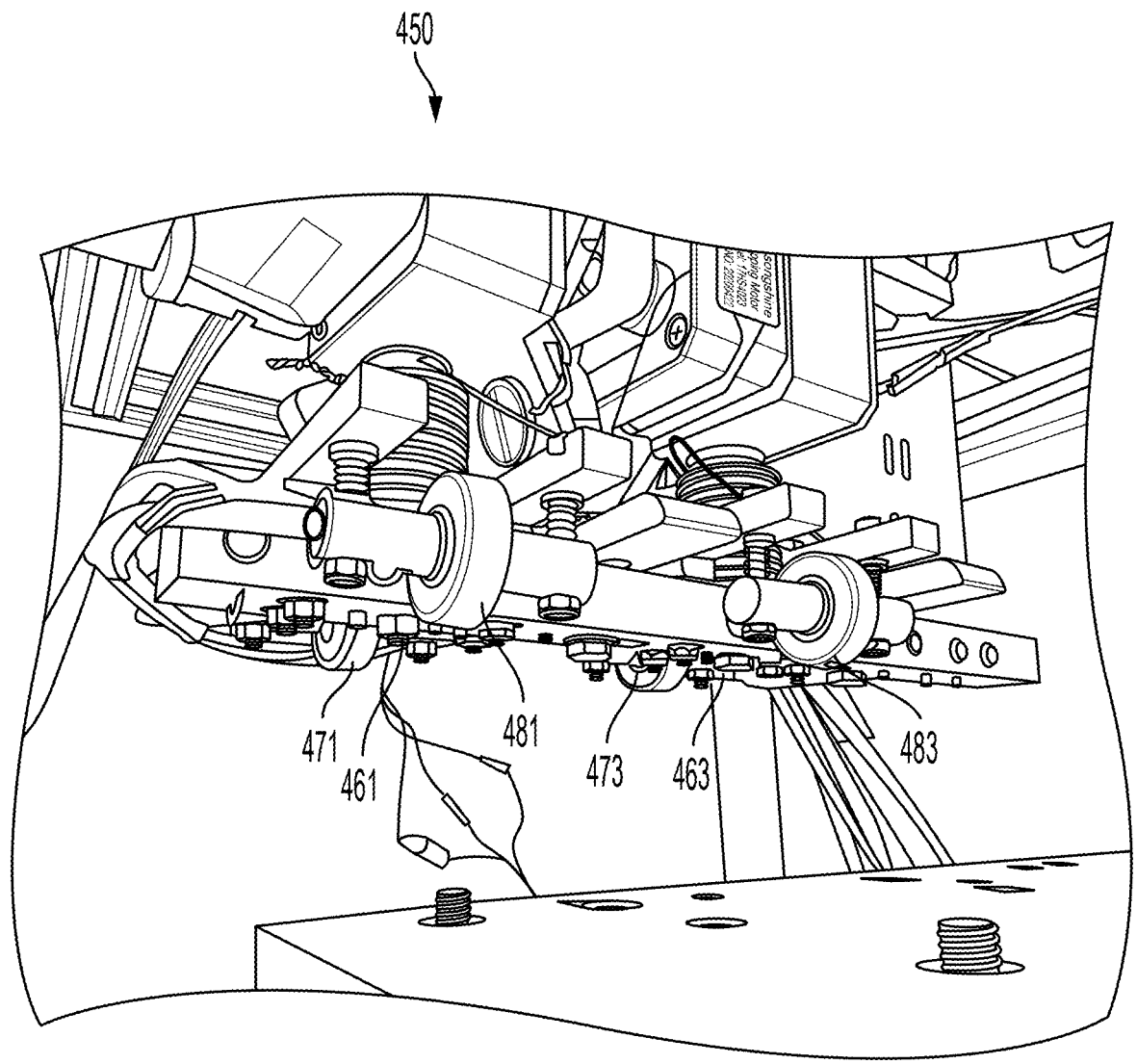
FIG. 4B is an example according to various embodiments, illustrating a photograph of a preliminary fabricated prototype of a multiplexing printhead block including a plurality of extruders positioned between a plurality of cylindrical wheel-style rollers.

FIG. 4A is an example according to various embodiments, illustrating a photograph of a preliminary fabricated prototype of a multiplexing printhead block including a plurality of extruders positioned between a plurality of bearing-style rollers. For example, the multiplexing printhead block 400 may include a first extruder 411 positioned between a first bearing-style roller 421 and a second bearing-style roller 431, as well as a second extruder 413 positioned between a third bearing-style roller 423 and a fourth bearing-style roller 433.

FIG. 4B is an example according to various embodiments, illustrating a photograph of a preliminary fabricated prototype of a multiplexing printhead block including a plurality of extruders positioned between a plurality of cylindrical wheel-style rollers. For example, the multiplexing printhead block 450 may include a first extruder 461 positioned between a first cylindrical wheel-style roller 471 and a second cylindrical wheel-style roller 481, as well as a second extruder 463 positioned between a third cylindrical wheel-style 473 and a fourth cylindrical wheel-style roller 483.

Figure 5A:
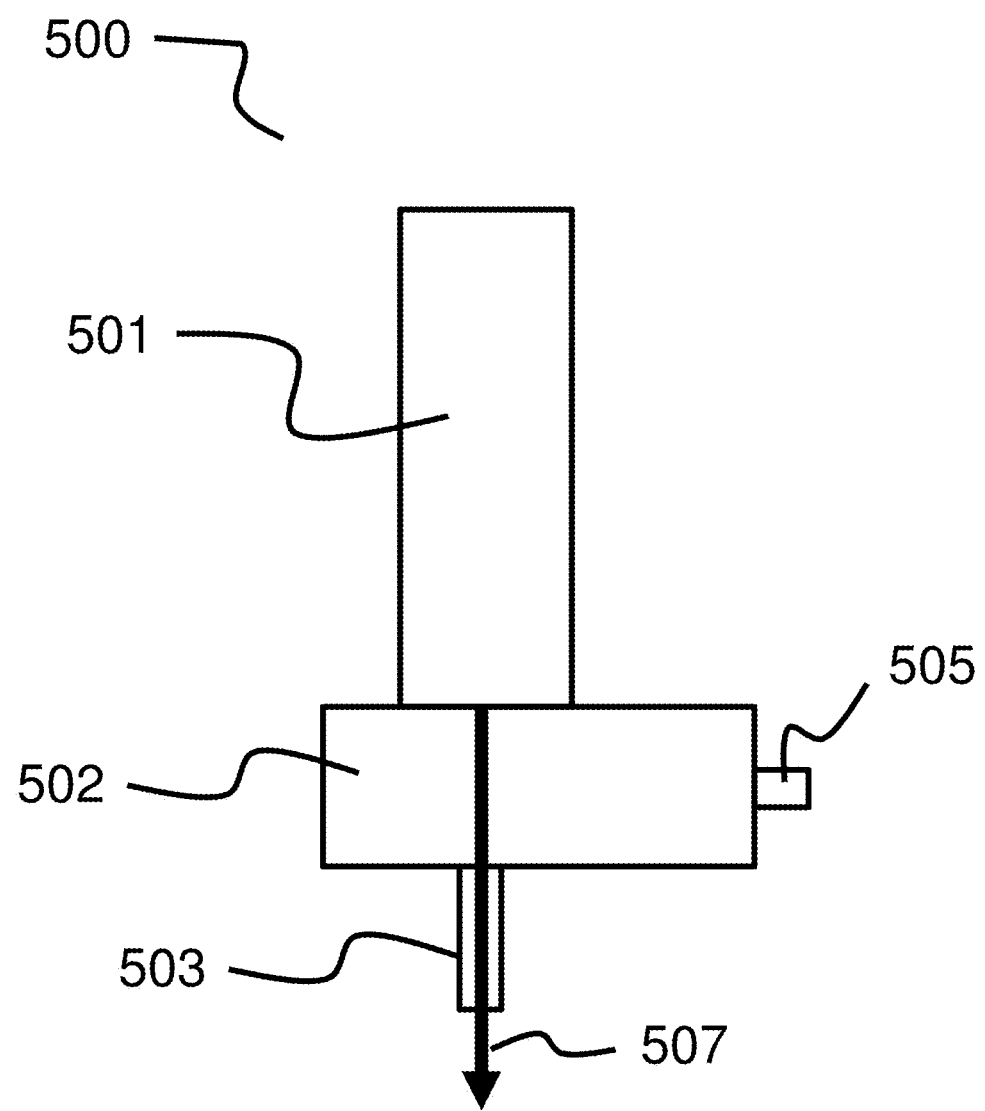
FIG. 5A is an example according to various embodiments, illustrating an alternative extruder assembly in a normal deposition configuration or state.

Various embodiments may employ multiple pellet-fed BAAM extruders in a similar manner as the filament-fed extruders used according to other embodiments. However, pellet-fed extruders cannot be used to rapidly turn deposition on and off with the use of a so-called "posiverter" or diversion valve which redirects material to an exhaust port for disposal. Unfortunately, diverting the flow as waste material can drastically increase the material wastage for large structures. FIG. 5A is an example according to various embodiments, illustrating an alternative extruder assembly in a normal deposition configuration or state. According to various other embodiments a pellet-fed nozzle with a posiverter may be used in the same configuration as an array of FFF nozzles.

Figure 5B:
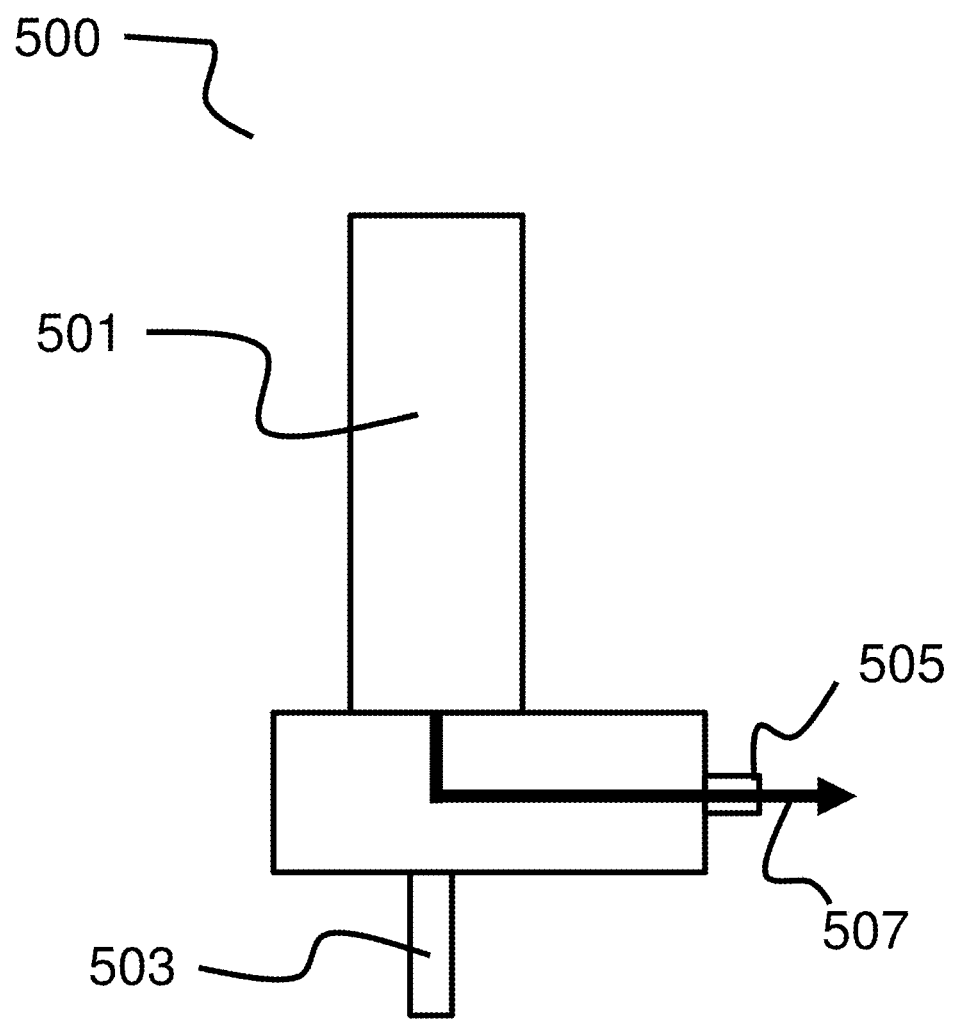
FIG. 5B is an example according to various embodiments, illustrating the alternative extruder assembly as shown in FIG. 5A in a non-deposition configuration or state.

FIG. 5B is an example according to various embodiments, illustrating the alternative extruder assembly as shown in FIG. 5A in a non-deposition configuration or state. The extruder assembly 500 may include an extruder 501 and a diverter 502 adapted to divert polymer flow 507 through a deposition nozzle 503 or through an exhaust 505. A drawback of this type of extruder assembly is that additional waste may be generated when the polymer flow 507 is diverted through the exhaust 505 during intervals where the nozzle should not be depositing the polymer flow 407 through the nozzle. This configuration is intended to prevent oozing by changing the nozzle design. A drawback of these methods is that they waste material by redirecting the material into a dump area when retraction is needed. This material waste can be a significant cost and energy sink when large parts are considered, since recycling of the material would become necessary. Other designs are unable to stop oozing and stringing consistently. Their complexity and limited performance make their commercial viability limited. The multiplexed 3D printing processes according to various embodiments avoids these issues because control is done from a purely software point-of-view.

Figure 6A:
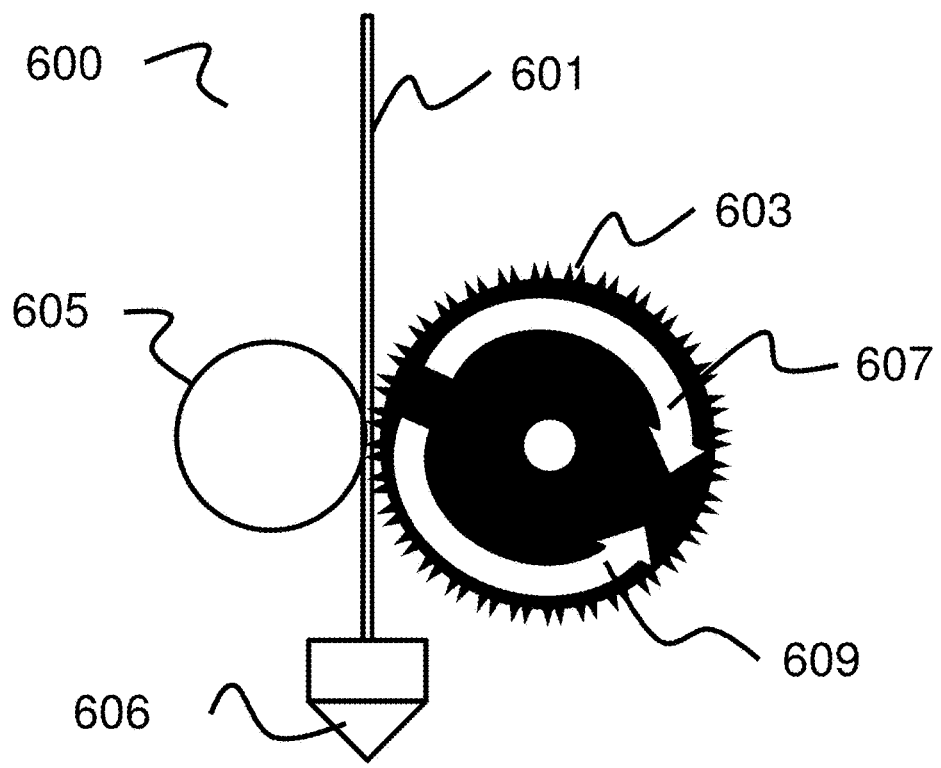
FIG. 6A is an example according to various embodiments, illustrating forward and reverse operation of an extruder assembly similar to the one shown in FIG. 1B.

FIG. 6A is an example according to various embodiments, illustrating forward and reverse operation of an extruder assembly similar to the one shown in FIG. 1B. The extruder assembly 600 may be configured to accept a polymer filament 601. The polymer filament 601 may pass between a filament gear 603 and a filament roller 605, which cooperate to pull the polymer filament 601 into the extruder assembly 600 and to urge the polymer filament 601 toward a nozzle 606 for deposition in a deposition state when the filament gear 603 rotates in a first direction 609. Alternatively, in a non-deposition or retraction state, the filament gear 603 rotates in a second direction 607 to pull the polymer filament 601 away from the nozzle 606 to prevent further deposition. The speed and direction of rotation of the gear may be controlled by a motor (not shown). The motor may be controlled by a computer system 1000 as illustrated in FIG. 10, based on a preloaded program that matches the part geometry.

Figure 6B:
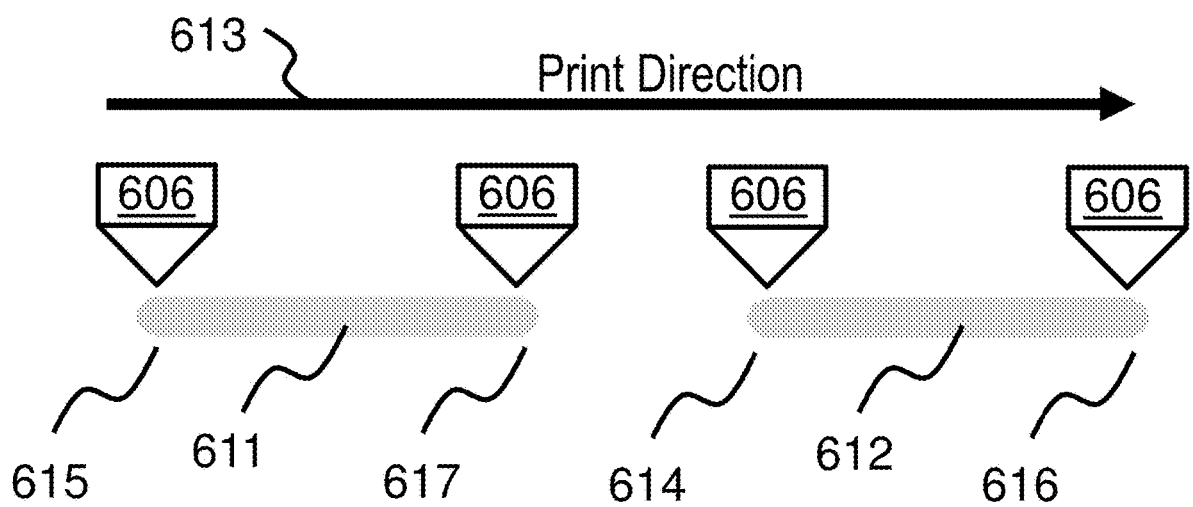
FIG. 6B is an example according to various embodiments, illustrating the deposition of a noncontinuous line of polymer.

FIG. 6B is an example according to various embodiments, illustrating the deposition of a noncontinuous line of polymer. The noncontinuous line of polymer may comprise a first segment 611 and a second segment 612. The first segment 611 may extend from a first point 615 to a second point 617. The second segment 612 may extend from a third point 614 to a fourth point 616. The nozzle 606 may pass from the first point 615 to the second point 617 to the third point 614 to the fourth point 616 as it travels in a print direction 613. The print direction 613 may be along one or more axes, as illustrated in FIG. 2, such as along the x-axis, y-axis, z-axis, or any combination thereof. To print the first segment 611, an extruder assembly (not shown) may operate in a deposition state from the first point 615 to the second point 617 to allow polymer to flow through the nozzle 606. At the second point 617, the extruder assembly may switch to a non-deposition state and continue in the non-deposition state until reaching the third point 614. While in the non-deposition state, polymer flow may be halted, reversed, or diverted. At the third point 614, the extruder assembly may switch back to a deposition state to deposit polymer between the third point 614 and the fourth point 616, where the extruder assembly may switch back to a non-deposition state. The deposition state may be achieved as shown in FIG. 5A via a diverter 502 or as shown in FIG. 6A via a reversible filament gear 603. Similarly, the non-deposition state may be achieved as shown in FIG. 5A via a diverter 502 or as shown in FIG. 6A via a reversible filament gear 603.

Figure 14:
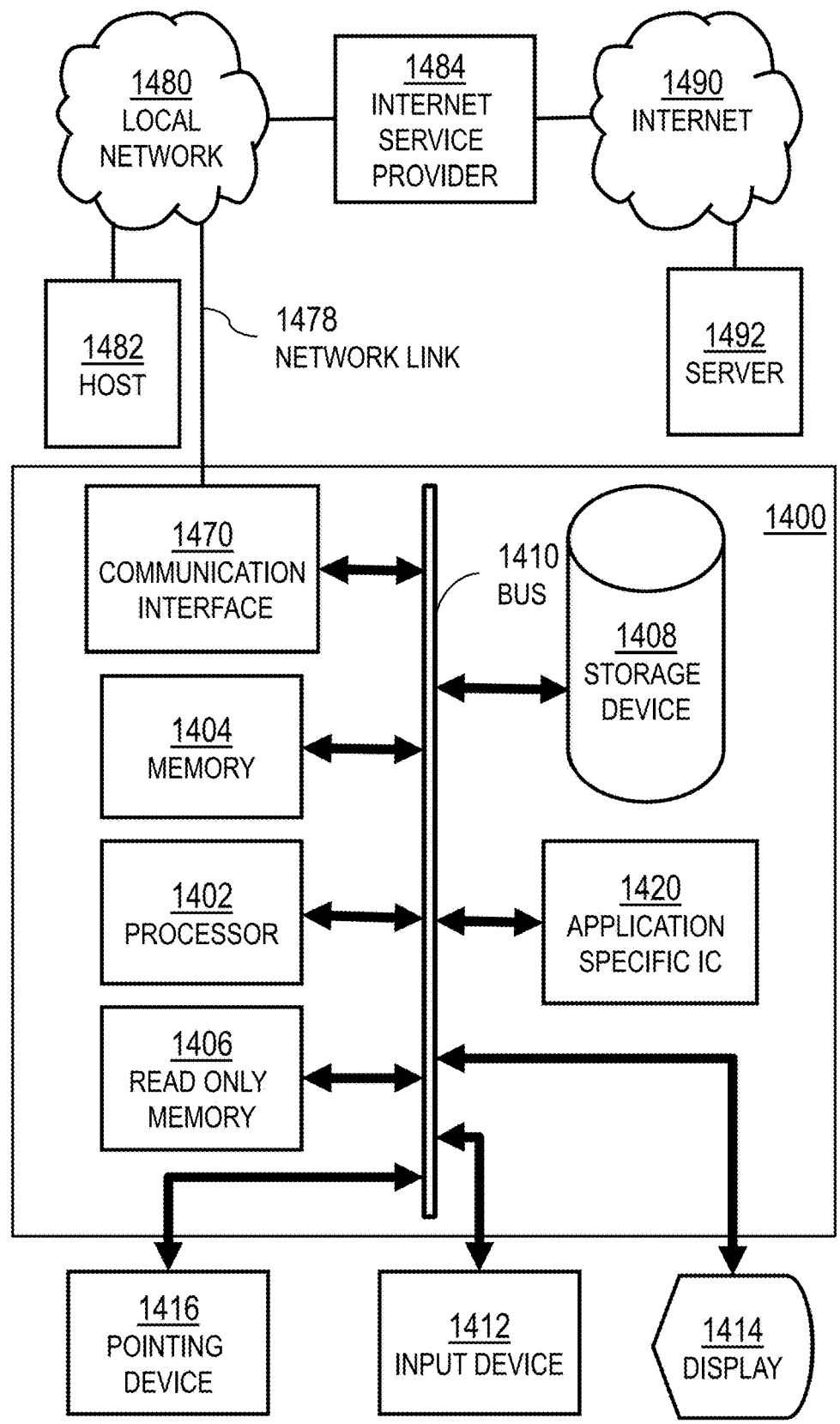
FIG. 14 is a block diagram that illustrates a computer system upon which an embodiment of the invention may be implemented.

According to various embodiments, nozzle deposition may be turned on and off by sending programmed scripts, for example via a computer system 1000 as illustrated in FIG. 14, to the extruder motors to either retract or push the solid filament by turning in opposite directions, thus forcing the molten polymer material out of or into the nozzle respectively. This switch between deposition and retraction may be performed without changing nozzle speed or stopping the nozzle. The extruder motor parameters for retraction and redeposition are determined by trial-and-error manually. While this yields good results, as evidenced by the complex shapes made in the examples presented herein, this process is still tedious. Various embodiments may, therefore, employ machine learning methods to determine these parameters automatically for any given nozzle.

Redeposition and retraction for a single nozzle has been applied in other additive manufacturing and 3D printing processes such as FFF. However, the redeposition and retraction method of the multiplexed 3D printing systems according to various embodiments proceeds contrary to a traditional assumption in the literature and in industrial practice. The traditional assumption has been that to perform an on-off redeposition and retraction without undesirable oozing and stringing, which would cause poor part geometry, one must stop the single nozzle, retract the material, move the nozzle, stop the nozzle again, and then start redepositing. While this traditional strategy works for FFF with a single nozzle it yields infeasible results for the multiplexed 3D printing system according to various embodiments presented herewith and is unable to fabricate complex objects with satisfactory part geometry. This is because while one nozzle is stationary and retracting the other nozzles in a multiplexed 3D printing system according to various embodiments are also stationary but potentially still depositing material, especially if the in-plane geometry is even slightly more complex than just a simple filled square. Various embodiments presented herewith equip each of a plurality of nozzles with an on-off capability and upend the traditional assumption, showing that retraction and redeposition are possible without stopping the nozzles at all.

Figure 7A:
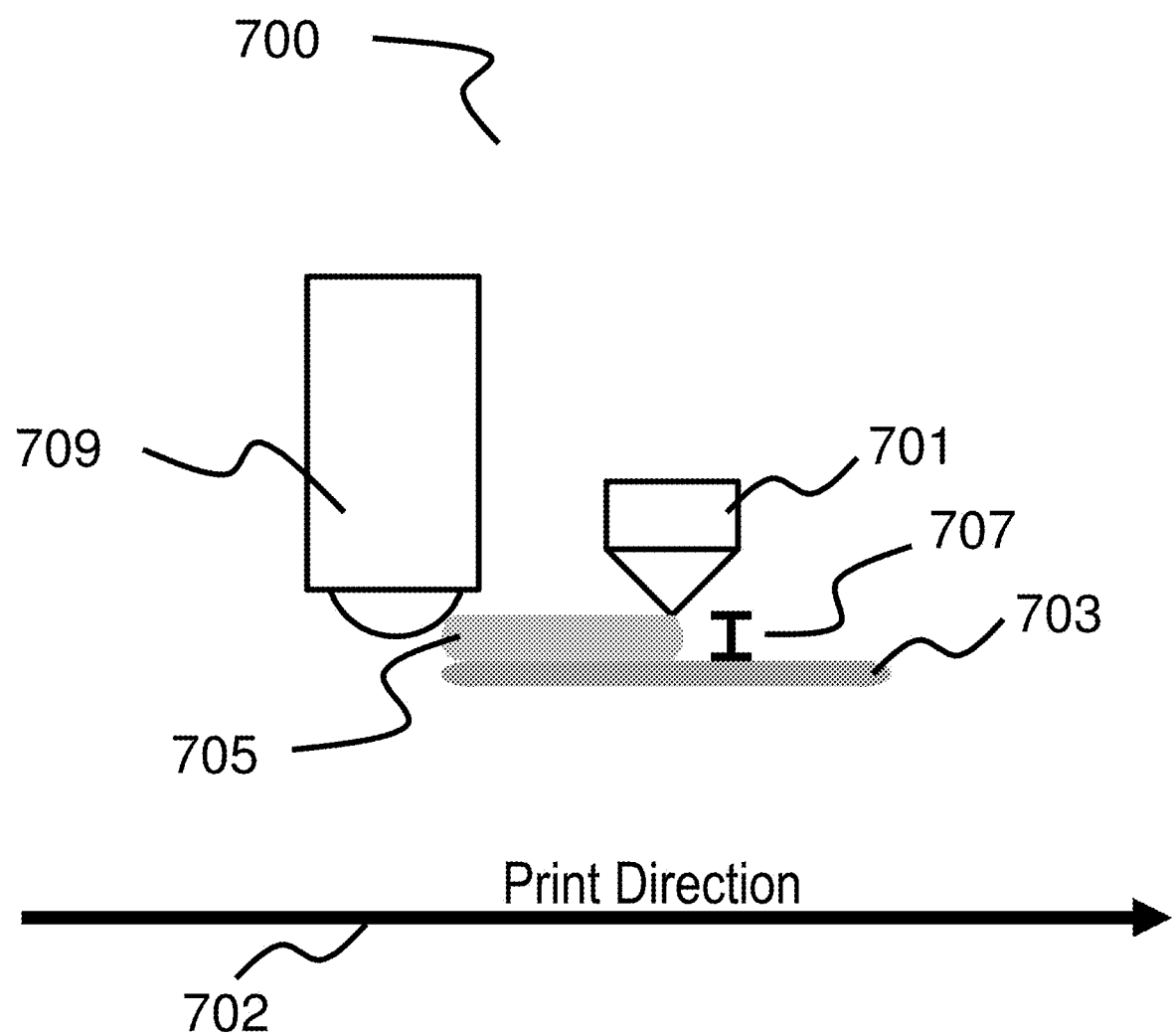
FIG. 7A is an example according to various embodiments, illustrating a portion of a multiplexing printhead block traveling in a print direction at a first time after deposition of a polymer layer.
Figure 7B:
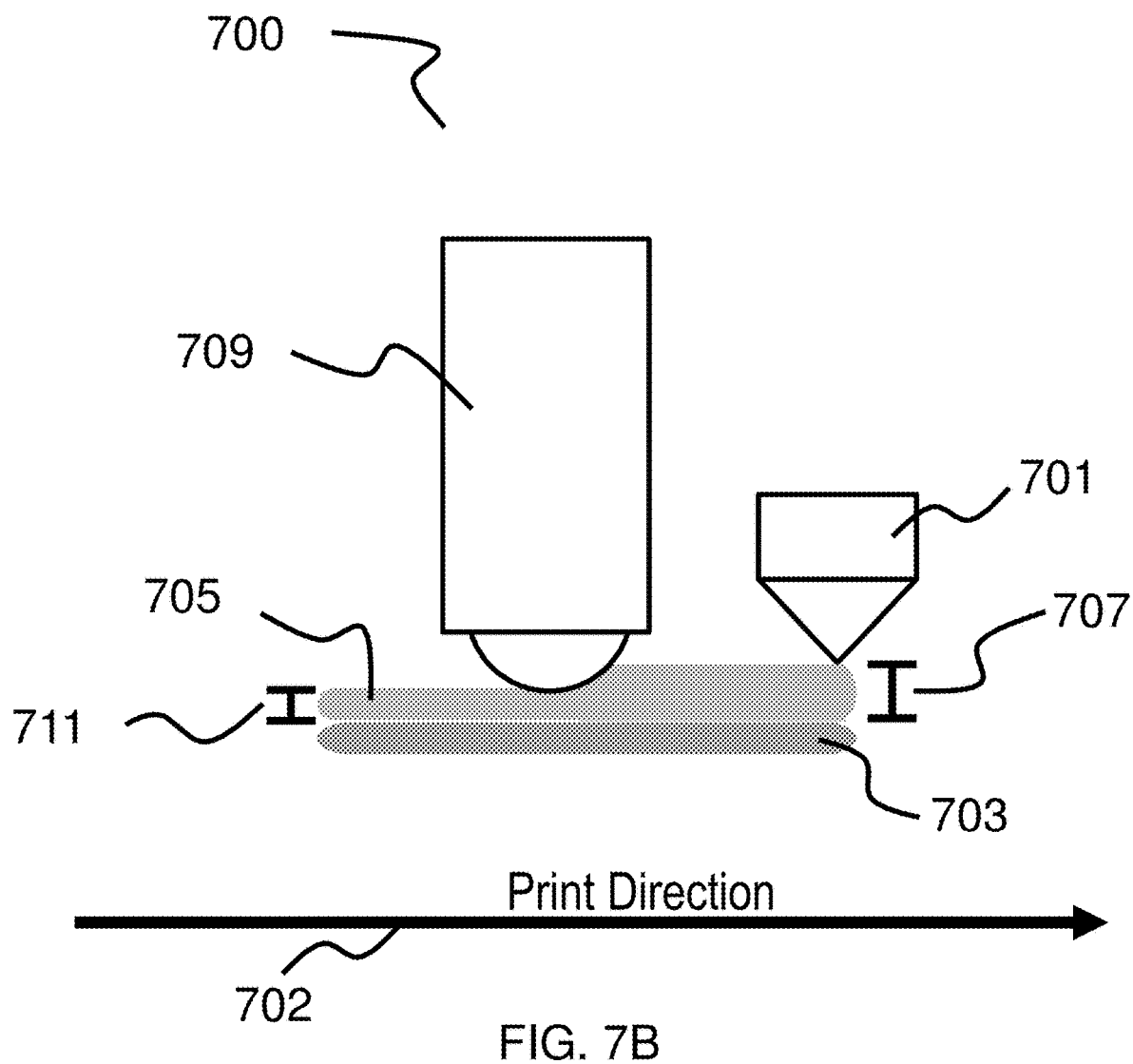
FIG. 7B is an example according to various embodiments, illustrating the portion of the multiplexing printhead block traveling in the print direction, as shown in FIG. 7A, at a second time after deposition of the polymer layer.
Figure 7C:
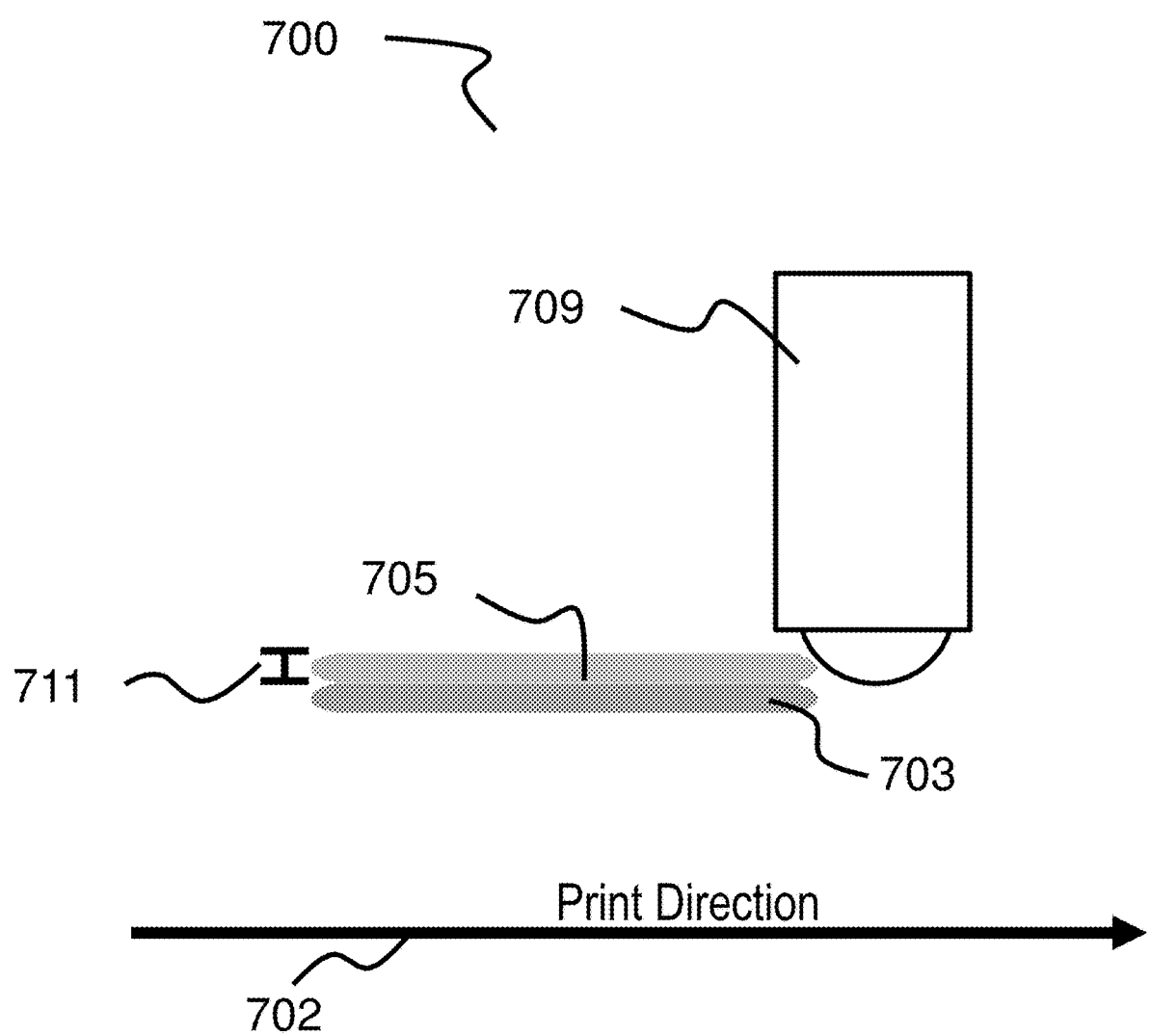
FIG. 7C is an example according to various embodiments, illustrating the portion of the multiplexing printhead block traveling in the print direction, as shown in FIGS. 7A and 7B, at a third time after deposition of the polymer layer.

According to various embodiments good adhesion at the interface between separately deposited lines of polymer may be ensured by a hot roller system. In such embodiments, one or more passive rollers that are weight-loaded and internally heated may be attached to each nozzle (See: FIGS. 7A-C). Right after polymer is deposited by a nozzle, the corresponding roller may pass over this just-deposited material. Due to the weights or spring-loading above the sphere, the weight on the polymer beads, including the interface, compresses the material locally to eliminate voids and increase the interface strength. The Examples presented hereinafter provide further details and comparisons between parts fabricated with and without rollers.

FIG. 7A is an example according to various embodiments, illustrating a portion of a multiplexing printhead block traveling in a print direction at a first time after deposition of a polymer layer. The multiplexing printhead block 700 may include an extruder assembly having a nozzle 701 and a roller 709 and may travel in a print direction 702. The print direction 702 may be along one or more axes, as illustrated in FIG. 2, such as along the x-axis, y-axis, z-axis, or any combination thereof. As shown in FIG. 7A, a first layer of polymer material 703 has been deposited by the extruder 701. A second layer of polymer material 705, having a first thickness 707, has also been deposited onto the first layer of polymer material 703 by the extruder assembly via the nozzle 701. At the first time illustrated in FIG. 7A, the roller 709 has just reached the second layer of polymer material 705. The roller 709 has been positioned relative to the nozzle 701 such that it will contact and compress the second layer of polymer material 705. For example, the position of the roller 709 may be such that a surface of its bearing or wheel extends below the tip of the nozzle 701, ensuring contact with the most recently deposited layer of polymer material. The roller 709 may also be spring-loaded or weighted.

FIG. 7B is an example according to various embodiments, illustrating the portion of the multiplexing printhead block traveling in the print direction, as shown in FIG. 7A, at a second time after deposition of the polymer layer. At the second time, the roller 709 has compressed a portion of the second layer of polymer material 705 to a second thickness 711. The second thickness 711 may be less than the first thickness 707. The extruder assembly has completed depositing the second layer of polymer material 705 and has switched to a non-deposition state.

FIG. 7C is an example according to various embodiments, illustrating the portion of the multiplexing printhead block traveling in the print direction, as shown in FIGS. 7A and 7B, at a third time after deposition of the polymer layer. At the third time, the roller 709 has compressed the entire second layer of polymer material 705 to the second thickness 711.

Advantageously, the thermomechanical compression system according to various embodiments comprising the one or more rollers does not need active control. Eliminating the need for active control greatly simplifies the process of achieving higher strength. This is a stark contrast to existing methods for increasing the part strength such as ultrasonic methods, plasma treatment methods, or local thermal heating methods. Moreover, ultrasonic methods only achieve 10-20% increase in strength as compared to the roller processes according to various embodiments. Plasma treatment methods need significantly more power than the roller processes according to various embodiments. Local thermal heating using lasers or hot guns is prone to causing warping of the printed bead, which is prevented in the roller processes according to various embodiments by the use of compression in addition to heating.

In the roller processes according to various embodiments, the weight on the balls that are on contact with the polymer can be changed by adding heavier rods above the steel sphere. According to various embodiments, changing the weight on the roller changes the compression and therefore changes the mechanical properties. The temperature of the steel sphere roller is kept above the glass transition temperature of the polymer but can be changed for optimal bead compression depending on layer material and geometry. The optimal temperature and weight must be identified based on additional scientific investigations that need to be performed and converted into practical design software tools.

Since the multiplexed 3D printing according to various embodiments deposit smaller beads of polymer, use of a heated roller is very beneficial. The smaller beads cool down much more quickly than larger beads, such as are deposited by BAAM. Since the beads deposited by BAAM are larger and have greater heat retention, application of additional heat may not be necessary and mechanical deformation of larger beads may be sufficient. Various embodiments may, however, employ mechanical deformation methods and apparatuses used in BAAM such as ultrasonic bonding or vibrational compression.

Various embodiments may also employ conventional plasma processing. Plasma processing may increase the welding between the deposited lines to increase the bond strength, but the absence of mechanical compression means that voids may still present in the material. Thus, the overall mechanical strength is not expected to be as high and was not reported. Further, plasma processing increases the processing time substantially since the deposition needs to be stopped in each layer for plasma processing. Further, this approach is not easily scalable to large parts due to the small size of the plasma generator and the large voltage needed for larger generators. Ultrasonic bonding has been used to increase the degree of bonding, but for a lamination-based process that is not relevant here. For example, using similar ultrasonic vibration in multiplexed 3D printing according to various embodiments would result in an increase in strength of only 10%. Local modification in thermal history using infrared lamps and lasers has also been pursued and shown to increase the mechanical strength. However, in the absence of accompanying localized compression via a roller, the thermal gradients often cause out-of-plane distortion of the part.

Figure 8:
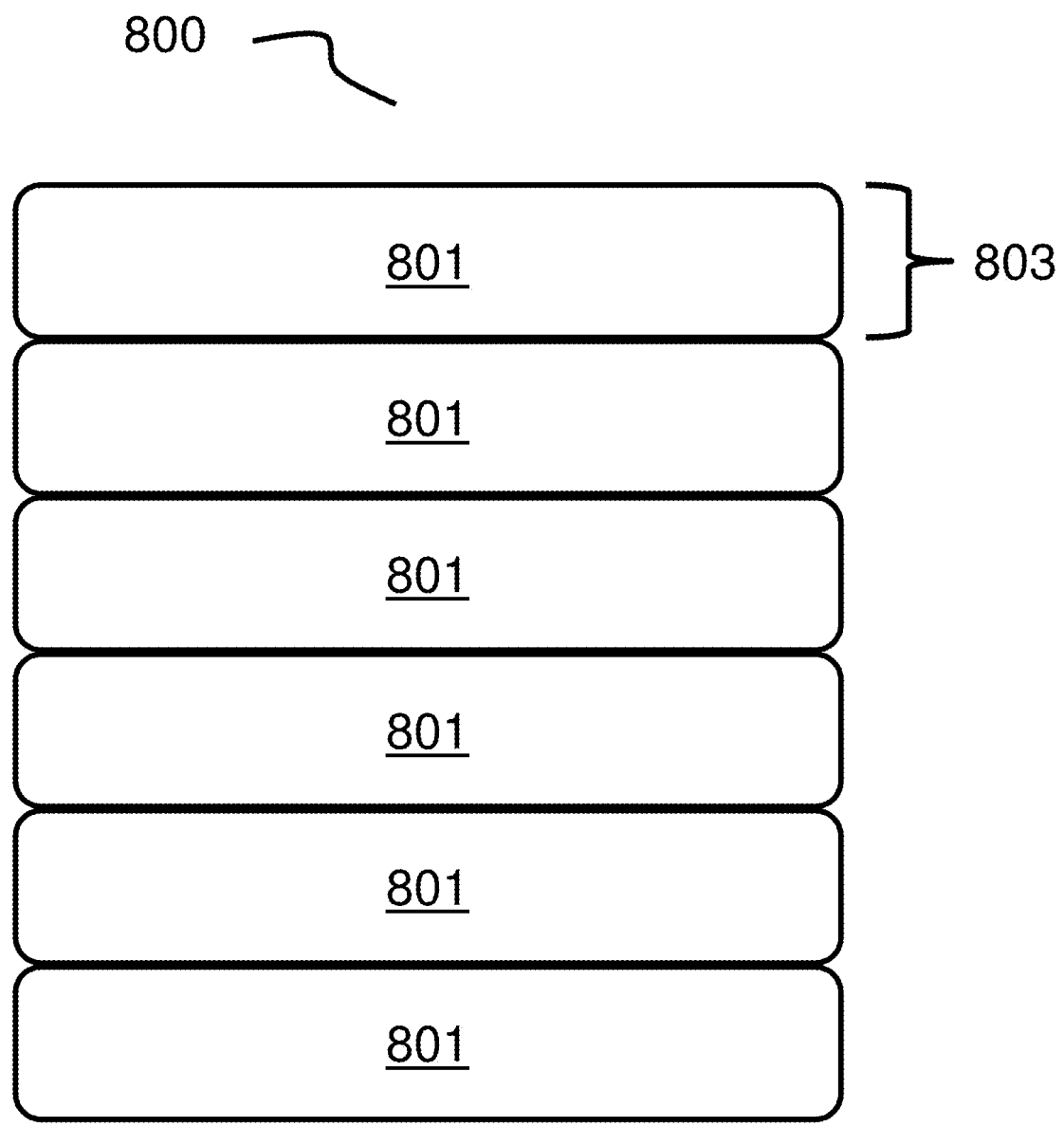
FIG. 8 is an example according to various embodiments, illustrating a structure comprising a plurality of layers, each having a thickness or height.

FIG. 8 is an example according to various embodiments, illustrating a structure 800 comprising a plurality of layers 801, each having a thickness or height 803. The structure 800 may be fabricated using a multiplexed 3D printing system according to various embodiments.

Figure 9:
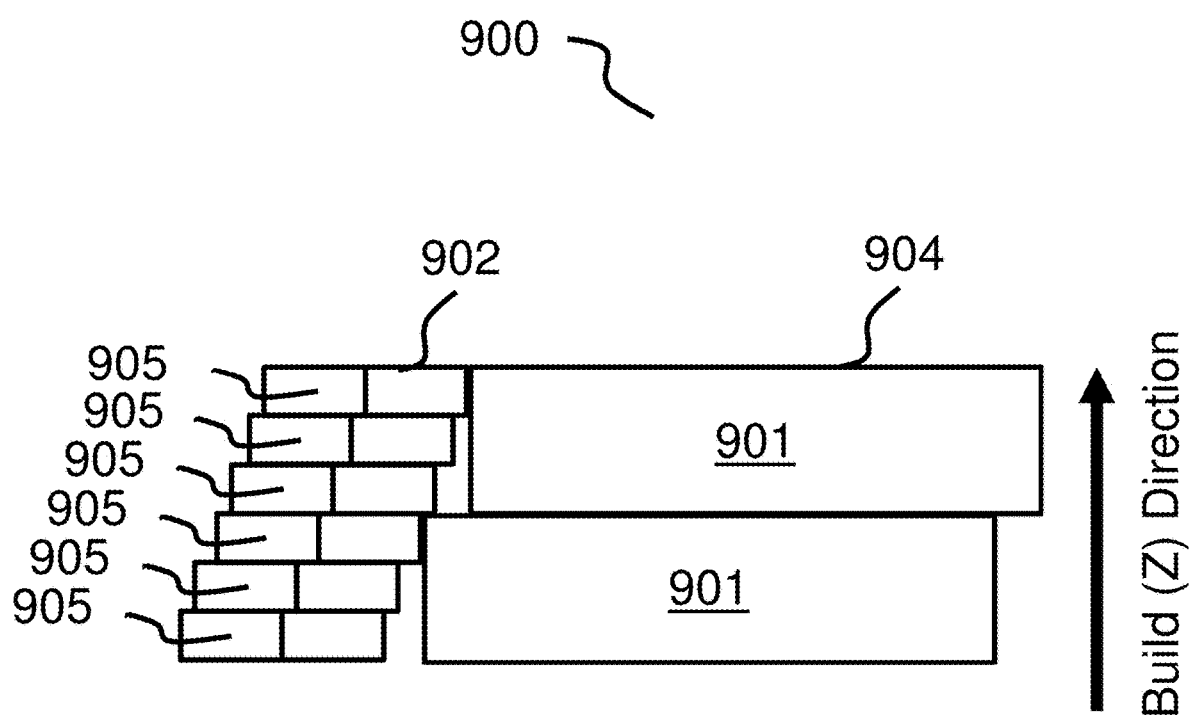
FIG. 9 is an example according to various embodiments, illustrating a structure comprising a first stack comprising first plurality of layers and a second stack comprising a second plurality of layers.

FIG. 9 is an example according to various embodiments, illustrating a structure 900 comprising a first stack 904 comprising first plurality of layers 901 and a second stack 902 comprising a second plurality of layers 905. While the first stack 904 has the same thickness or height as the second stack 902, each of the second plurality of layers 905 have a smaller thickness or height than each of the first plurality of layers 901. The smaller thickness or height of each of the second plurality of layers 905 provides a smoother outer surface to the structure 900 than would be achieved with only the first stack 904. Despite their lower exterior smoothness or resolution, the layers 901 of the first stack 904 may deposited at a greater volumetric flow rate, thereby decreasing the overall fabrication time. According to various embodiments the layers 901 of the first stack 904 may be deposited by a first nozzle at the same time as the layers 905 of the second stack are deposited by a second nozzle.

Another approach to dealing with the issue of high resolution is to adaptively change the nozzle diameter via mechanical constrictions in a BAAM nozzle. This also allows an adaptive change in the layer height over two different values and is coupled with higher-resolution printing in the outer region of the part and low-resolution printing in the bulk of the part. However, the selective reduction in the layer height still adds significantly to the fabrication time since only a single nozzle is being used.

Rather than using a single nozzle with a larger diameter to print a large structure, various embodiments simultaneously fabricate different sections of a larger part using multiple smaller nozzles used in conventional MatEx. One-dimensional (1D) lines or two-dimensional (2D) arrays of nozzles may be mounted at fixed distances on the same XYZ gantry without any additional motion stages or robots. To create a 2D layer of the three-dimensional (3D) part, the gantry is scanned across the previously built layer and polymer deposition from the nozzle is turned on and off depending on the geometry of the 2D layer. Since multiple nozzles are being used, various embodiments retain the advantages of using smaller width (w) and height (h) without reducing the throughput. Achieving a desired throughput simply requires the addition of more nozzles without needing additional gantries or robotic motion platforms.

Various embodiments utilize gantry scanning and dynamic on-off operation of the nozzles. It is possible, though not ideal, for each nozzle to be controlled individually. For example, multiple robots may be used to build different sections of the same structure at the same time, such that each robot carries one nozzle, and each nozzle follows a conventional MatEx toolpath. Since each nozzle requires a separate robot or gantry the total machine cost becomes very high when trying to match the throughput of BAAM by adding 36 nozzles. Each such robot may have a high cost. Thus, the cost of using 36 robots for achieving similar throughput as BAAM becomes unreasonably high. On the other hand, various embodiments may utilize gantry scanning and dynamic on-off operation of the nozzles to reduce the number of robots and/or gantry systems needed. For example, various embodiments only need one such robot or a single gantry.

Figure 10A:
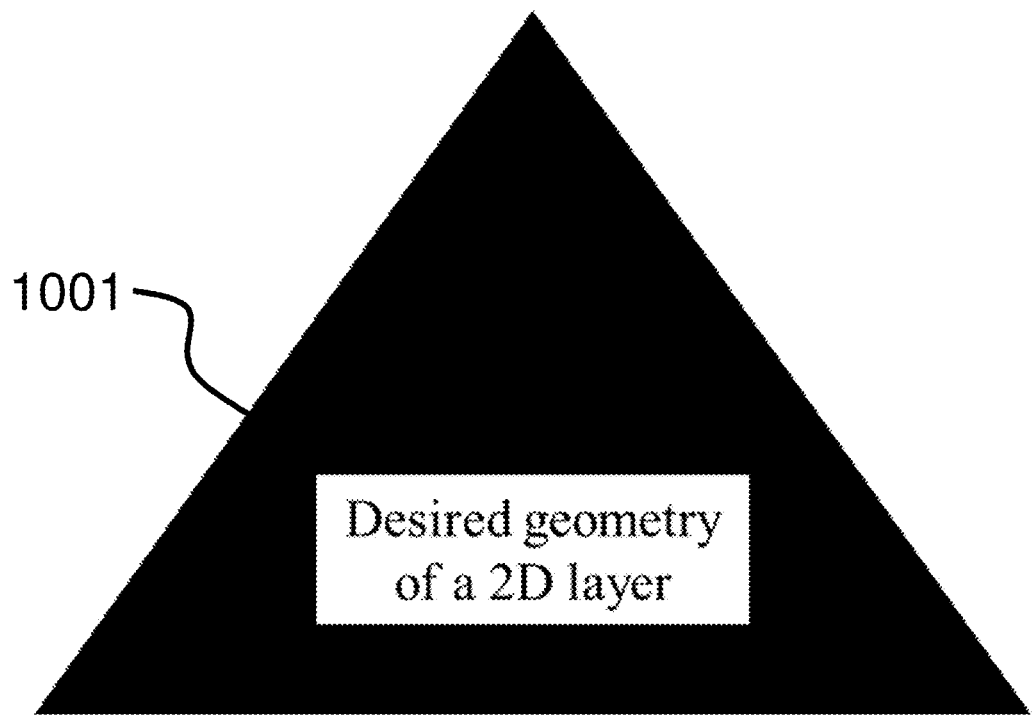
FIG. 10A is an example according to various embodiments, illustrating a desired geometry of a 2D layer of a 3D part
Figure 10B:
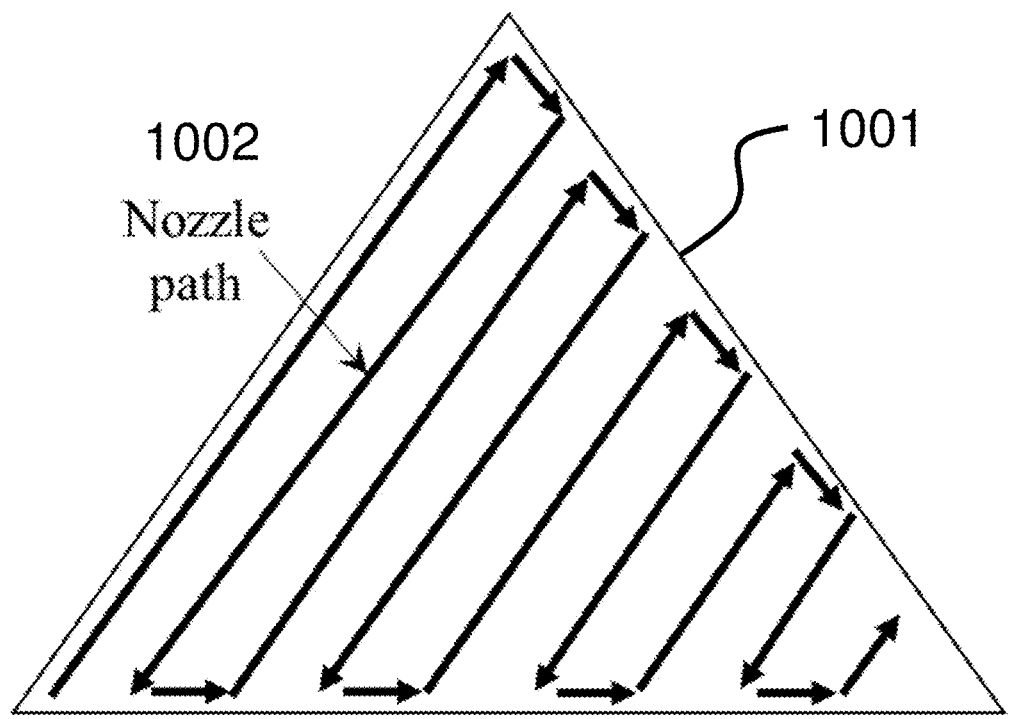
FIG. 10B is an example according to various embodiments, illustrating a conventional nozzle path for 3D printing, such as via Fused Filament Fabrication (FFF).

Multiplexed Fused Filament Fabrication uses an array of FFF nozzles mounted on the same XYZ motion stage, without controlling each nozzle's motion individually. The toolpath in Multiplexed 3D printing is different from that in conventional FFF or BAAM. In conventional FFF or BAAM a single nozzle follows the shortest linear path to layer completion with minimal or no retractions of the filament. FIG. 10A is an example according to various embodiments, illustrating a desired geometry of a 2D layer 1001 of a 3D part. FIG. 10B is an example according to various embodiments, illustrating a conventional nozzle path 1002 to print the geometry of the 2D layer 1001 using conventional FFF.

Figure 10C:
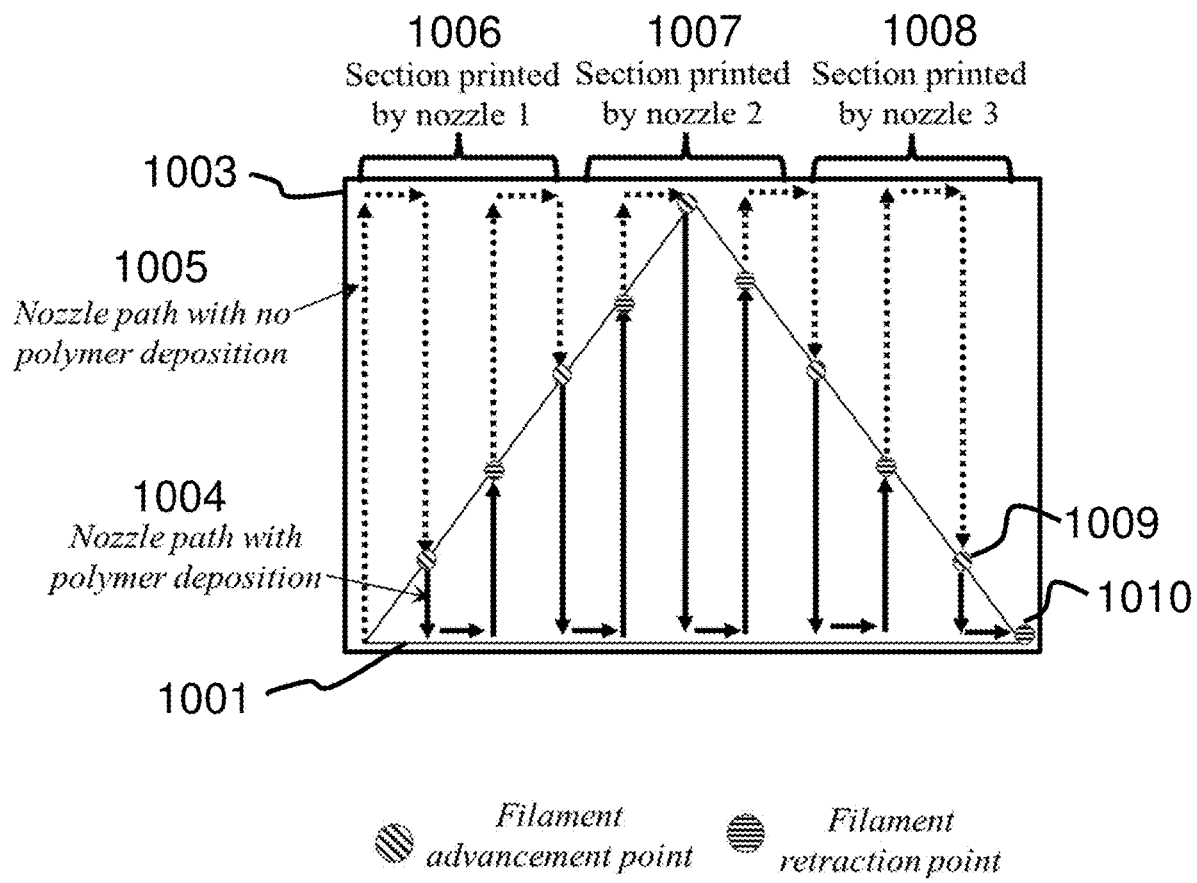
FIG. 10C is an example according to various embodiments, illustrating a path of nozzles and retraction/advancement points for a scanning-based approach according to various embodiments.

FIG. 10C is an example according to various embodiments, illustrating a gantry-scanning path for a nozzle array mounted on the gantry. The nozzle array may be scanned across the smallest rectangle 1003 that bounds the 2D layer's geometry 1001. Each nozzle concurrently prints distinct sections of the 2D layer. More specifically, the path comprises deposition segments 1004 (solid) in which polymer is deposited by one or more of the nozzles and non-deposition segments 1005 (dotted) over which polymer is not deposited by one or more of nozzles. The figure also shows a plurality of advancement points 1009 and retraction points 1010 along the path, representing points at which a particular nozzle switches between a state in which it is depositing or retracting. The nozzle array for which the gantry-scanning path is shown in FIG. 10C includes at least three nozzles. Each nozzle prints a distinction section of the 2D layer's geometry 1001. For example, a first nozzle or a first plurality of nozzles may print a first section 1006 of the 2D layer; a second nozzle or a second plurality of nozzles may print a second section 1007 of the 2D layer; and a third nozzle or a third plurality of nozzles may print a third section 1008 of the 2D layer.

According to various embodiments, the small size of each nozzle may create small polymer roads or beads and may ensure high resolution. The cumulative extrusion rate of the concurrently printing nozzles enables high throughput. Spatially specific deposition allows geometric complexity. Spatially specific deposition is enabled by dynamic filament retraction and advancement in each nozzle during scanning. Filament retraction causes deposition of the polymer to stop. Filament advancement causes deposition of the polymer to start. In this context, the term "dynamic" in the phrase "dynamic filament retraction and advancement" is a reference to the motion of the nozzle array, which does not stop or start during retraction and advancement, unlike FFF. Since each nozzle may switch between advancement and retraction, the motion of the nozzle array along the gantry-scanning path need not stop and start. Avoiding stopping and starting the gantry is a major advantage of various embodiments not only because it allows the layer 1001 to be produced more quickly, but also because strong junctions between individual lines of polymer deposited within a given section. Without wishing to be bound by theory, the stronger junctions may be due to the quicker deposition rate, allowing less time for the freshly deposited line of polymer to cool.

Figure 10D:
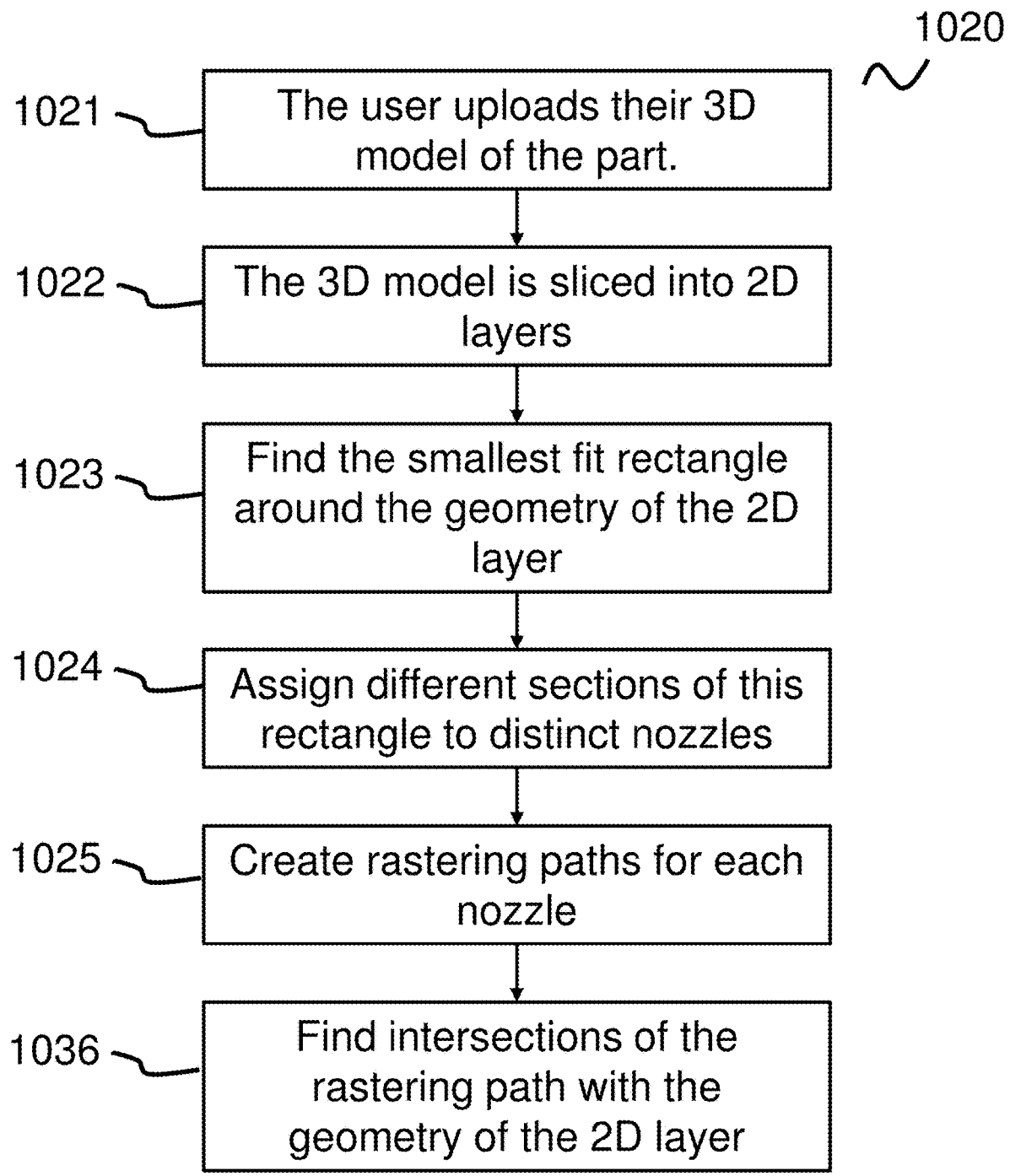
FIG. 10D is an example according to various embodiments, illustrating a schematic flowchart of a process for determining a gantry-scanning toolpath for multiplexed 3D printing according to various embodiments.

FIG. 10D is an example according to various embodiments, illustrating a schematic flowchart of a process 1020 for determining a gantry-scanning toolpath for multiplexed 3D printing according to various embodiments.

The process 1020 for determining a multiplexed 3D printing toolpath may include a first step 1021 in which the user uploads their 3D model of the part. In a second step 1022, the 3D model may be sliced into 2D layers, similar to conventional FFF or BAAM. Beyond this point the approach changes as compared to conventional FFF or BAAM. For each 2D layer the following steps may be performed, for example via software. In a third step 1023, the process 1020 may proceed to find the smallest fit rectangle around the geometry of the 2D layer. Next, in a fourth step 1024, the process 1020 may include assigning different sections of the smallest fit rectangle to distinct nozzles. Next, in a fifth step 1025, the process 1020 may include creating rastering paths for each nozzle. The paths may include both deposition segments 1004 (solid) in which polymer is deposited by one or more of the nozzles and non-deposition segments 1005 (dotted) over which polymer is not deposited by one or more of nozzles as shown in FIG. 10C. Finally, the process 1020 may include a sixth step 1026 of finding intersections of the rastering path with the geometry of the 2D layer, for example the triangular layer geometry 1001, as shown in FIG. 10C. The sixth step 1026 may identify the lines where printing should occur (solid lines 1004 in FIG. 10C) and where printing should not occur (dotted lines 1005 in FIG. 10C) and identifies the retraction/advancement points.

Additional innovations that accompany this Multiplexed 3D printing according to various embodiments process include (a) the use of a heated roller in conjunction with each nozzle in order to simultaneously heat and compress the material and thus achieve even better mechanical properties (b) the use of machine vision techniques, acoustic feedback measurement of flow rates, and/or dynamic feedback control may be used to calibrate and control the retraction/advancement parameters for multiple nozzles during the print process (c) the innovation of a scanning toolpath for multiplexed 3D printing with dynamic on-off control of the nozzles is in stark contrast to conventional toolpath approach that could not be used at all for Multi3D.

As will be readily appreciated by those having ordinary skill in the art, the calibration process may be performed by a variety of methods. One exemplary calibration strategy may be based on machine vision to determine the ideal filament retraction/advancement parameters needed to achieve acceptable geometric accuracy during printing.

Figure 11:
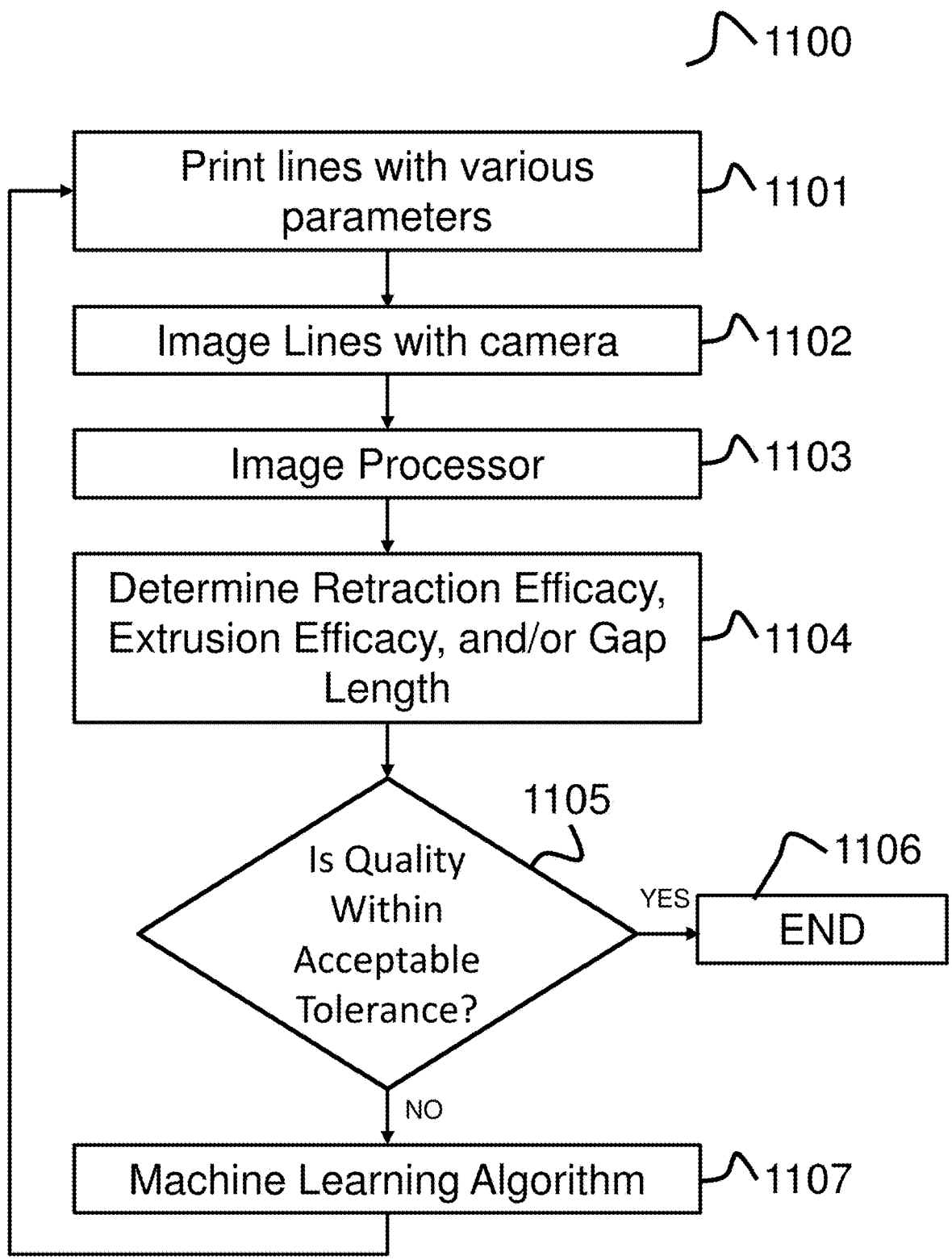
FIG. 11 is an example according to various embodiments, illustrating a flowchart for a process 1100 for selection of retraction/advancement parameters for each nozzle in a nozzle array, using machine learning.
Figure 12A:
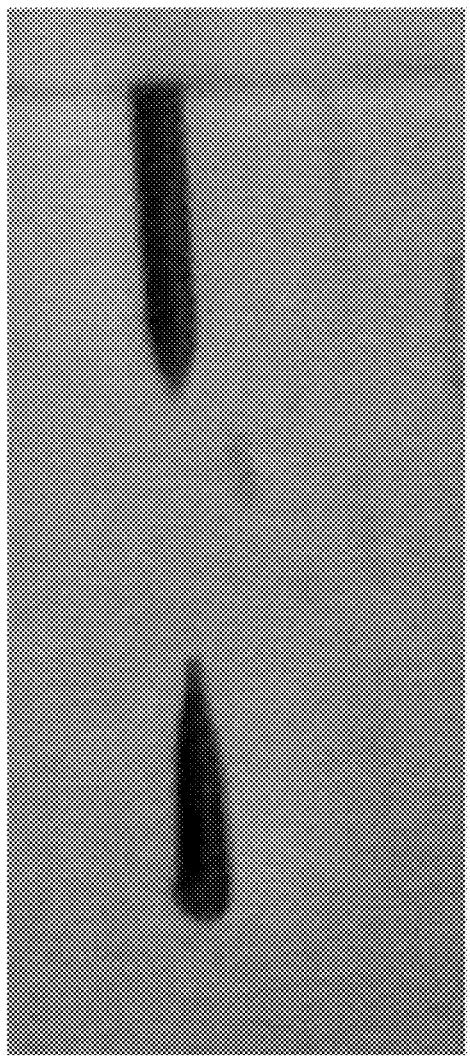
FIG. 12A is an example according to various embodiments, illustrating a photograph of printed beads with a gap therebetween.
Figure 12B:
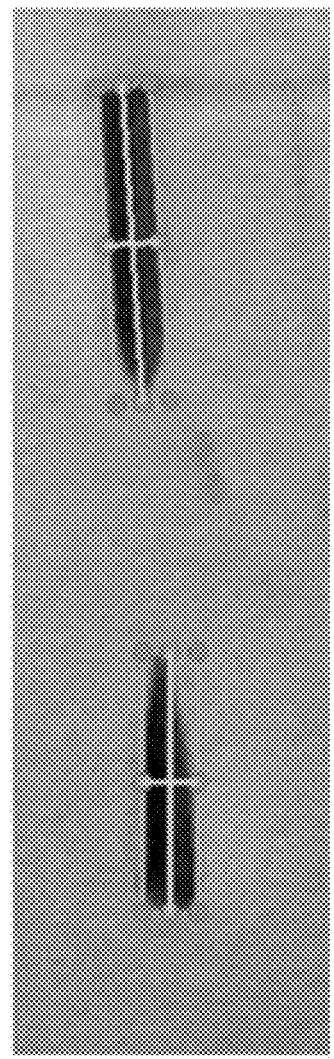
FIG. 12B is an example according to various embodiments, illustrating image processor output of the photograph shown in FIG. 12A.

FIG. 11 is an example according to various embodiments, illustrating a flowchart for a process 1100 for selection of retraction/advancement parameters for each nozzle in a nozzle array, using machine learning. In a first step 1101 of the process 1100, individual lines may be printed with a retraction step followed by an advancement step in the same line. This technique may create lines with gaps in them as illustrated in FIGS. 12A and 12B. FIG. 12A is an example according to various embodiments, illustrating a photograph of printed beads with a gap therebetween. FIG. 12B is an example according to various embodiments, illustrating image processor output of the photograph shown in FIG. 12A. In a second step 1102 of the process 1100, an array of retraction distances, retraction speeds, and advancement speeds may be used to create the lines as illustrated in FIGS. 12A and 12B. Images of these printed lines and gaps may be taken automatically using an in-situ mounted camera.

Referring again to FIG. 11, in a third step 1103 of the process 1100, image processing based on contrast between the lines and the build platen may be used to identify the boundaries of the lines and thereby determine the line length after retraction and the gap length after redeposition. In a fourth step 1104 of the process 1100, retraction efficacy, extrusion efficacy, and/or gap length may be determined. In a fifth step 1105, a determination may be made as to whether the quality of the retraction efficacy, extrusion efficacy, and/or gap length is within an acceptable tolerance. If these parameters are within acceptable tolerances, the process 1100 may conclude, assigning the parameters used in step 1101 to the nozzle tested. If the parameters are not within acceptable tolerances in the fifth step 1105, then the process 1100 may proceed to step 1107 at which the parameters may be optimized. The optimal combination of retraction distances, retraction speeds, and advancement speeds may be chosen based on at least the following criteria (a) the line length after retraction should attain a targeted low value, e.g., zero; (b) the gap length after redeposition should attain a targeted value based on the part geometry. As will be appreciated by those having ordinary skill in the art, these choices may be made based on optimization techniques and algorithms like machine learning. The process 1100 may then return to the first step 1101 where the new parameters determined by the optimization techniques may be tested.

Figure 13:
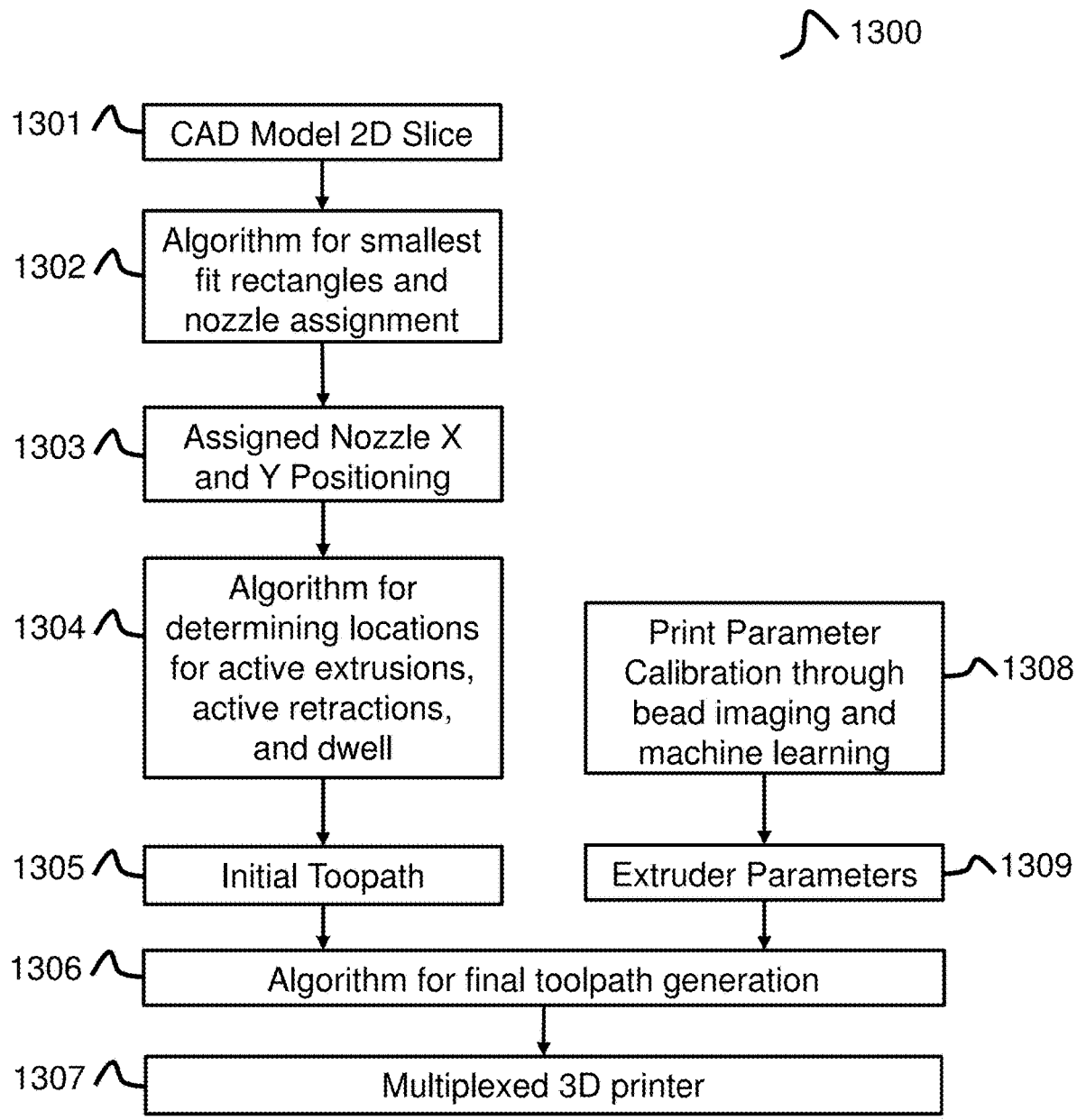
FIG. 13 is an example according to various embodiments, illustrating a software logic flowchart.

Potential applications of the various embodiments described herein may include both products and services. Services may include ultrafast and low-cost fabrication of large molding dies, actual composite aerospace and windmill parts, large composite replacement automotive parts, construction scaffolds and equipment. Products may include multiplexing 3D printing systems and associated software. FIG. 13 is an example according to various embodiments, illustrating a software logic flowchart 1300.

First the user calibrates the retraction and advancement parameters 1308, such as the rate of retraction or deposition, as described with respect to the process as shown in FIG. 11, which results in calibrated extruder parameters 1309. Then the user inputs a CAD model 1301 of the desired part that is sliced into 2D layers. For each 2D layer an algorithm 1302 may determine the smallest fit rectangle that bounds the 2D layer. Next, based on the algorithm's determination of the smallest fit rectangle, nozzles may be assigned at step 1303 to print different sections of the 2D layer. In the next step 1304, the scanning toolpath and the specific retraction and advancement points are selected for use at each of the retraction and advancement points during the scanning process and output as an initial toolpath 1305. The optimized retraction/advancement parameters 1305 and the extruder parameters 1309 are then used to determine a final toolpath 1306 for the multiplexed 3D printer 1307.

Computational Hardware Overview

FIG. 14 is a block diagram that illustrates a computer system 1400 upon which an embodiment of the invention may be implemented. Computer system 1400 includes a communication mechanism such as a bus 1410 for passing information between other internal and external components of the computer system 1400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1400, or a portion thereof, constitutes a means for performing one or more steps of one or more methods described herein.

A sequence of binary digits constitutes digital data that is used to represent a number or code for a character. A bus 1410 includes many parallel conductors of information so that information is transferred quickly among devices coupled to the bus 1410. One or more processors 1402 for processing information are coupled with the bus 1410. A processor 1402 performs a set of operations on information. The set of operations include bringing information in from the bus 1410 and placing information on the bus 1410. The set of operations also typically include comparing two or more units of information, shifting positions of units of information, and combining two or more units of information, such as by addition or multiplication. A sequence of operations to be executed by the processor 1402 constitutes computer instructions.

Computer system 1400 also includes a memory 1404 coupled to bus 1410. The memory 1404, such as a random-access memory (RAM) or other dynamic storage device, stores information including computer instructions. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of computer instructions. The computer system 1400 also includes a read only memory (ROM) 1406 or other static storage device coupled to the bus 1410 for storing static information, including instructions, that is not changed by the computer system 1400. Also coupled to bus 1410 is a non-volatile (persistent) storage device 1408, such as a magnetic disk or optical disk, for storing information, including instructions, that persists even when the computer system 1400 is turned off or otherwise loses power.

Information, including instructions, is provided to the bus 1410 for use by the processor from an external input device 1412, such as a keyboard containing alphanumeric keys operated by a human user, or a sensor. A sensor detects conditions in its vicinity and transforms those detections into signals compatible with the signals used to represent information in computer system 1400. Other external devices coupled to bus 1410, used primarily for interacting with humans, include a display device 1414, such as a cathode ray tube (CRT) or a liquid crystal display (LCD), for presenting images, and a pointing device 1416, such as a mouse or a trackball or cursor direction keys, for controlling a position of a small cursor image presented on the display 1414 and issuing commands associated with graphical elements presented on the display 1414.

In the illustrated embodiment, special purpose hardware, such as an application specific integrated circuit (IC) 1420, is coupled to bus 1410. The special purpose hardware is configured to perform operations not performed by processor 1402 quickly enough for special purposes. Examples of application specific ICs include graphics accelerator cards for generating images for display 1414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1400 also includes one or more instances of a communications interface 1470 coupled to bus 1410. Communication interface 1470 provides a two-way communication coupling to a variety of external devices that operate with their own processors, such as printers, scanners, and external disks. In general, the coupling is with a network link 1478 that is connected to a local network 1480 to which a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization, or other physical properties of carrier waves. For wireless links, the communications interface 1470 sends and receives electrical, acoustic, or electromagnetic signals, including infrared and optical signals, that carry information streams, such as digital data.

The term computer-readable medium is used herein to refer to any medium that participates in providing information to processor 1402, including instructions for execution. Such a medium may take many forms, including, but not limited to, non-volatile media, volatile media, and transmission media. Non-volatile media include, for example, optical or magnetic disks, such as storage device 1408. Volatile media include, for example, dynamic memory 1404. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1402, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1402, except for carrier waves and other signals.

Logic encoded in one or more tangible media includes one or both of processor instructions on a computer-readable storage media and special purpose hardware, such as ASIC 1420.

Network link 1478 typically provides information communication through one or more networks to other devices that use or process the information. For example, network link 1478 may provide a connection through local network 1480 to a host computer 1482 or to equipment 1484 operated by an Internet Service Provider (ISP). ISP equipment 1484 in turn provides data communication services through the public, world-wide packet-switching communication network of networks now commonly referred to as the Internet 1490. A computer called a server 1492 connected to the Internet provides a service in response to information received over the Internet. For example, server 1492 provides information representing video data for presentation at display 1414.

The invention is related to the use of computer system 1400 for implementing the techniques described herein. According to one embodiment of the invention, those techniques are performed by computer system 1400 in response to processor 1402 executing one or more sequences of one or more instructions contained in memory 1404. Such instructions, also called software and program code, may be read into memory 1404 from another computer-readable medium such as storage device 1408. Execution of the sequences of instructions contained in memory 1404 causes processor 1402 to perform the method steps described herein. In alternative embodiments, hardware, such as application specific integrated circuit 1420, may be used in place of or in combination with software to implement the invention. Thus, embodiments of the invention are not limited to any specific combination of hardware and software.

The signals transmitted over network link 1478 and other networks through communications interface 1470, carry information to and from computer system 1400. Computer system 1400 can send and receive information, including program code, through the networks 1480, 1490 among others, through network link 1478 and communications interface 1470. In an example using the Internet 1490, a server 1492 transmits program code for a particular application, requested by a message sent from computer 1400, through Internet 1490, ISP equipment 1484, local network 1480 and communications interface 1470. The received code may be executed by processor 1402 as it is received or may be stored in storage device 1408 or other non-volatile storage for later execution, or both. In this manner, computer system 1400 may obtain application program code in the form of a signal on a carrier wave.

Various forms of computer readable media may be involved in carrying one or more sequence of instructions or data or both to processor 1402 for execution. For example, instructions and data may initially be carried on a magnetic disk of a remote computer such as host 1482. The remote computer loads the instructions and data into its dynamic memory and sends the instructions and data over a telephone line using a modem. A modem local to the computer system 1400 receives the instructions and data on a telephone line and uses an infra-red transmitter to convert the instructions and data to a signal on an infra-red a carrier wave serving as the network link 1478. An infrared detector serving as communications interface 1470 receives the instructions and data carried in the infrared signal and places information representing the instructions and data onto bus 1410. Bus 1410 carries the information to memory 1404 from which processor 1402 retrieves and executes the instructions using some of the data sent with the instructions. The instructions and data received in memory 1404 may optionally be stored on storage device 1408, either before or after execution by the processor 1402.

Figure 15:
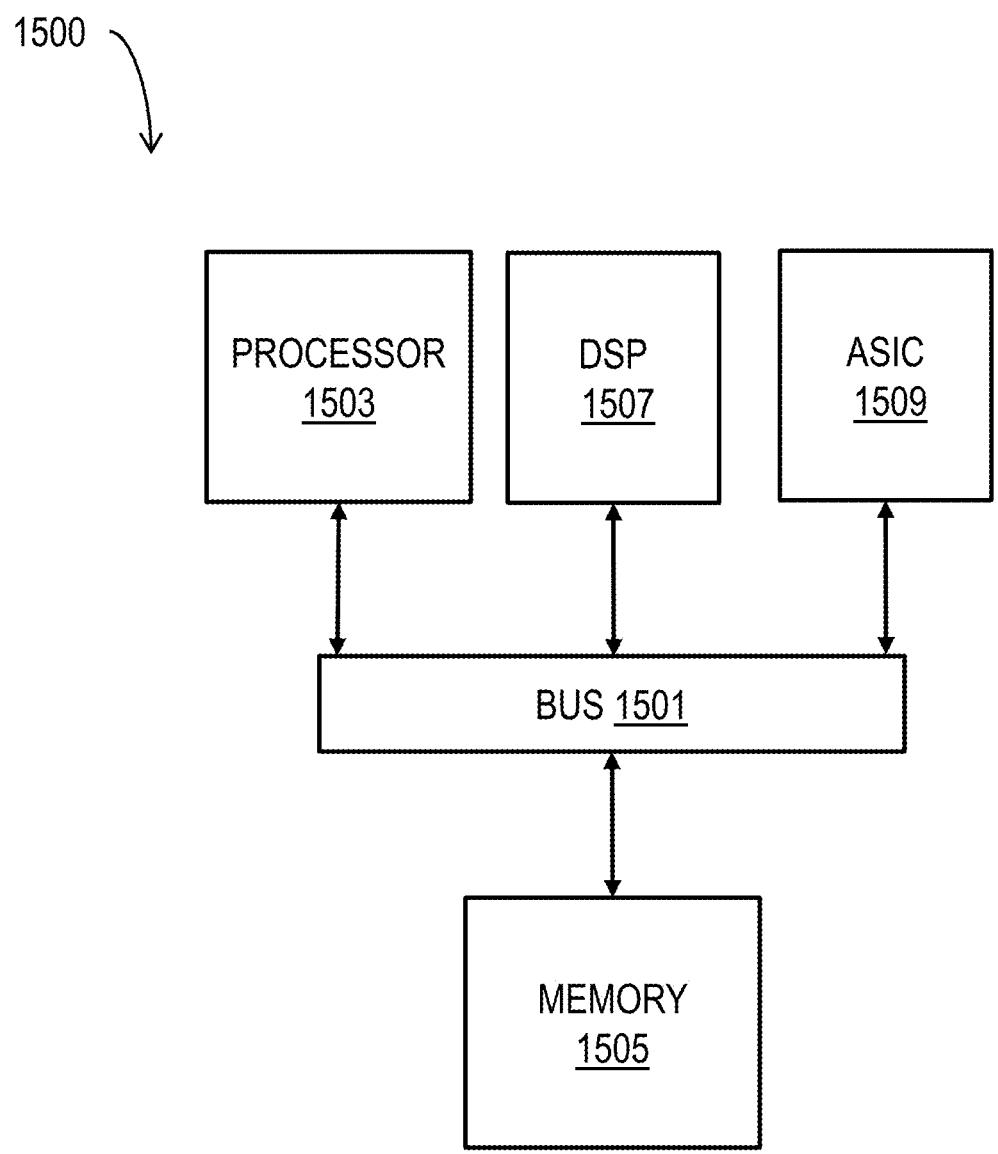
FIG. 15 illustrates a chip set upon which an embodiment of the invention may be implement.

FIG. 15 illustrates a chip set 1500 upon which an embodiment of the invention may be implemented. Chip set 1500 is programmed to perform one or more steps of a method described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1500, or a portion thereof, constitutes a means for performing one or more steps of a method described herein.

In one embodiment, the chip set 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively, or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1505 also stores the data associated with or generated by the execution of one or more steps of the methods described herein.

EXAMPLES

The following examples are put forth to provide those of ordinary skill in the art with a complete disclosure and description of how to perform the methods, how to make, and how to use the compositions and compounds disclosed and claimed herein. Efforts have been made to ensure accuracy with respect to numbers (e.g., amounts, temperature, etc.), but some errors and deviations should be accounted for. The purpose of the following examples is not to limit the scope of the various embodiments, but merely to provide examples illustrating specific embodiments.

Example 1

A purpose of this example was to demonstrate the printing of a variety of structures using a multiplexed 3D printing system according to various embodiments. This example further demonstrates that although the three exemplified sections were printed simultaneously, they need not have the same shape. This shape-independence of simultaneously printed section is possible because the multiplexed 3D printing system according to various embodiments may switch between a deposition and a nondeposition state and because each extruder may be independently controlled, for example by a computer system 1400 as illustrated in FIG. 14.

A preliminary working prototype was made. It has 3 nozzles, and the fabrication time is 3× lesser than conventional MatEx printer.

All of the structures illustrated in FIGS. 16A, 16B, 16C, 16D, 16E, 16F, and 16G were printed with a polylactic acid (PLA) polymer filament. A 1.75 mm diameter polylactic acid (PLA) printed at 200 degrees Celsius out of a 0.4 mm diameter nozzle with a build plate temperature of 60 deg C. and an array motion speed of 100 mm/hr was employed. An array of three nozzles was used for demonstration purposes.

These photographs provide examples of parts fabricated using the multiplexed 3D printing according to various embodiments prototype. Different colors of polymer correspond to section of the part made by a distinct nozzle. Although the image is presented in grayscale, the distinctions between the colors are still readily apparent. The actual material of each section here is the same, though it can also be different. Note that the fabrication time is 3× faster than conventional MatEx since three nozzles are used.

Figure 16A:
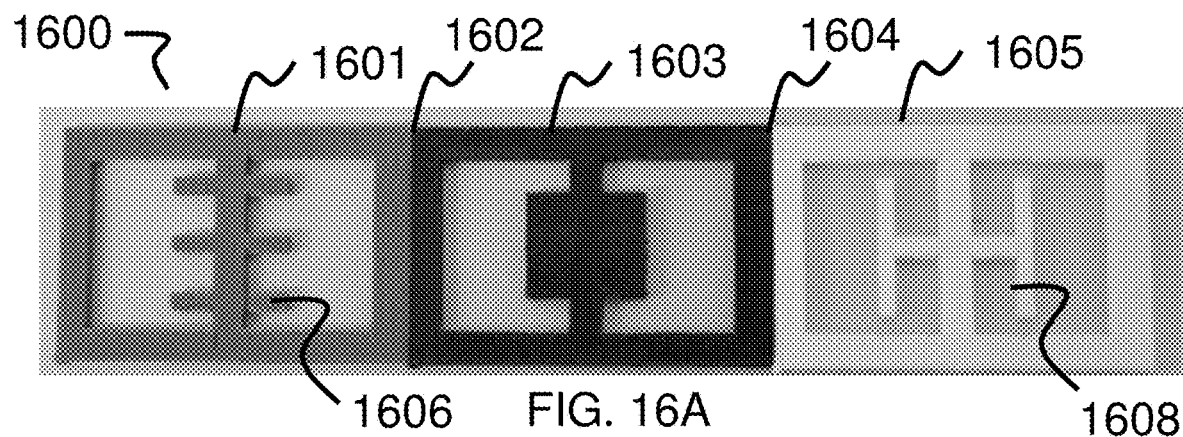
FIGS. 16A, 16B, 16C, 16D, 16E, 16F, and 16G are examples according to various embodiments, illustrating photographs of a parts printed using a multiplexed 3D printing system according to various embodiments.

FIG. 16A is an example according to various embodiments, illustrating a photograph of a single part printed in three distinct colors using a multiplexed 3D printing system according to various embodiments. The single part 1600 includes a first section 1601, a second section 1603, and a third section 1605, which were all printed simultaneous. The first section 1601 having been deposited via a first nozzle and smoothed by a first set of rollers, while the second section 1603 was deposited via second nozzle and smoothed by a second set of rollers, and while the third section 1605 was deposited via a third nozzle and smoothed by a third set of rollers. The first section 1601 abuts and is rigidly connected to the second section 1602 at a first intersection 1602. The second section abuts and is rigidly connected to the third section 1605 at a second intersection 1604. The first section 1601 includes a first plurality of protrusions 1606. Similarly, the third section 1605 includes a second plurality of protrusions 1608. The first plurality of protrusions 1606 are oriented horizontally while the second plurality of protrusions 1608 are oriented vertically. The FIG. 16A demonstrates that since three uniquely shaped sections may be printed simultaneously because each of the plurality of extruders may be independently controlled and switched between a deposition state and a retraction state, as discussed in greater detail with reference to FIG. 16B.

Figure 16B:
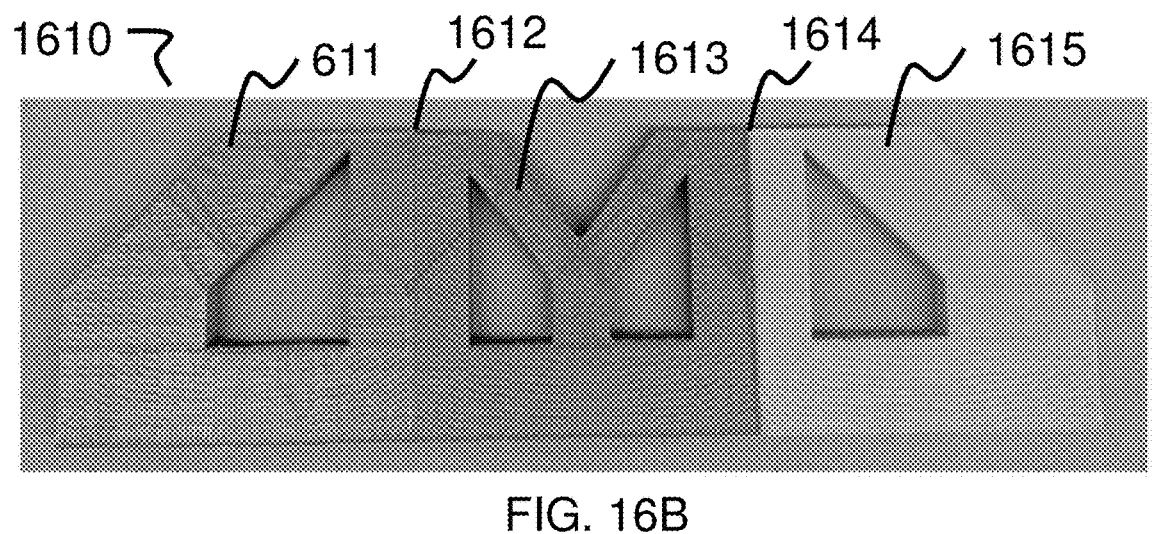
Figure 16C:
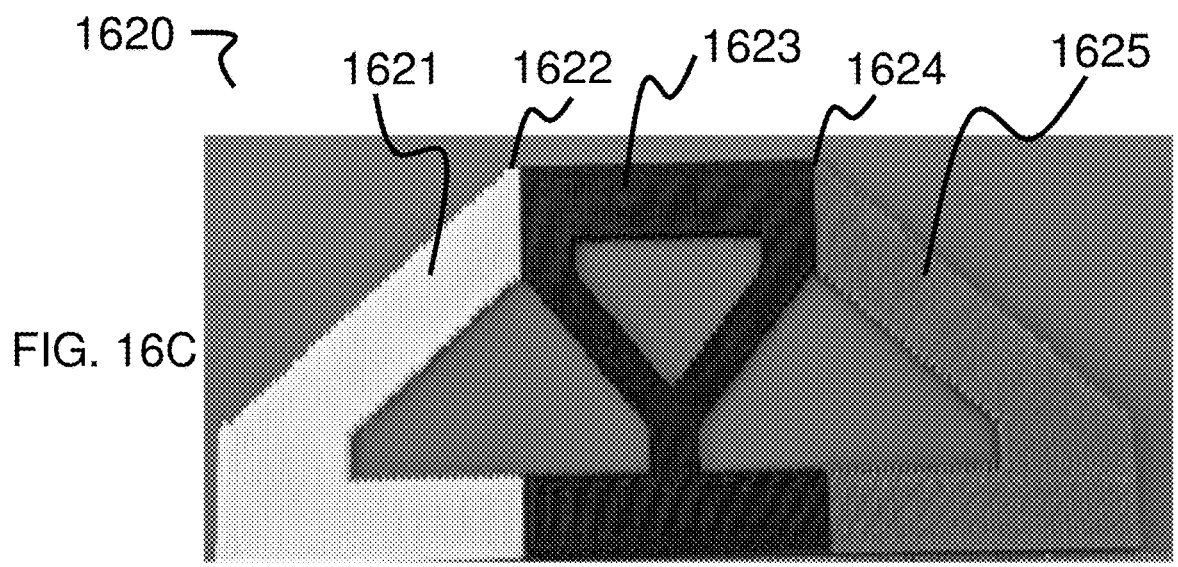
Figure 16D:
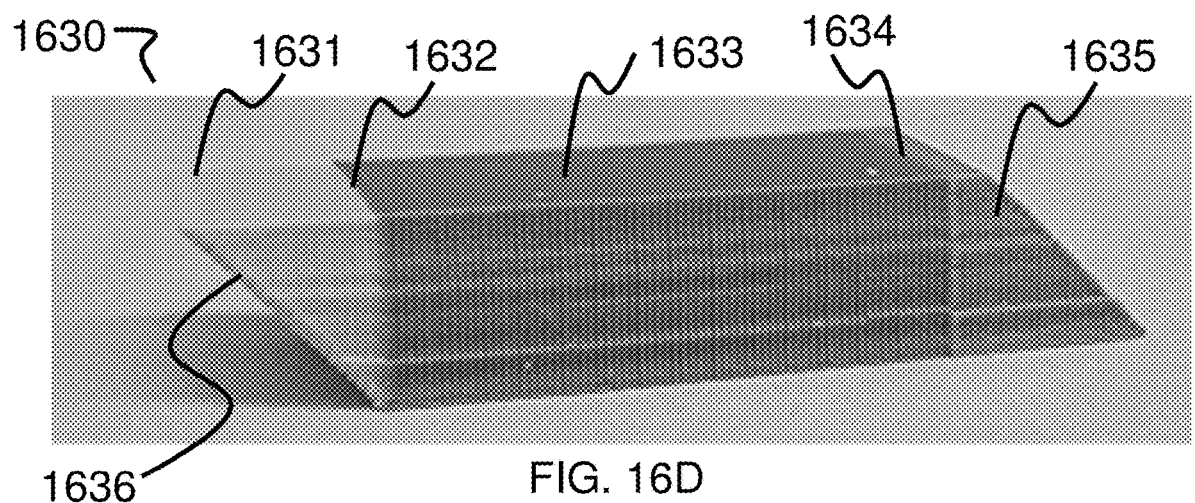

FIG. 16B is an example according to various embodiments, illustrating a photograph of a single part printed in three distinct colors using a multiplexed 3D printing system according to various embodiments. The discussion of FIG. 16A applies to this figure. For brevity, FIG. 16B shows a single part 1610 comprising a first section 1611 abutting and rigidly connected to a second section 1613 at a first intersection 1612, as well as a third section 1615 abutting and rigidly connected to the second section 1613 at a second intersection 1614. Similarly, FIG. 16C is an example according to various embodiments, illustrating a photograph of a single part printed in three distinct colors using a multiplexed 3D printing system according to various embodiments. The discussion of FIG. 16A applies to this figure. For brevity, FIG. 16C shows a single part 1620 comprising a first section 1621 abutting and rigidly connected to a second section 1623 at a first intersection 1622, as well as a third section 1625 abutting and rigidly connected to the second section 1623 at a second intersection 1624. Similarly, FIG. 16D is an example according to various embodiments, illustrating a photograph of a single part printed in three distinct colors using a multiplexed 3D printing system according to various embodiments. The discussion of FIG. 16A applies to this figure. For brevity, FIG. 16D shows a single part 1630 comprising a first section 1631 abutting and rigidly connected to a second section 1633 at a first intersection 1632, as well as a third section 1635 abutting and rigidly connected to the second section 1633 at a second intersection 1634. Unlike state-of-the-art BAAM processes, in which the ability to fabricate overhanging parts is dependent on the local part geometry, which often limits the geometric complexity to prismatic structures or requires changes in the design of the part itself, the first section 1631 includes an overhang 1636. The overhangs demonstrate that the printed parts are truly 3D in nature, in contrast to a 2.5D part in which a 2D layer is projected vertically upwards without the ability to change geometry in the build direction. A large element of the geometric potential in 3D printing is unlocked through the ability to create overhangs.

Figure 16E:
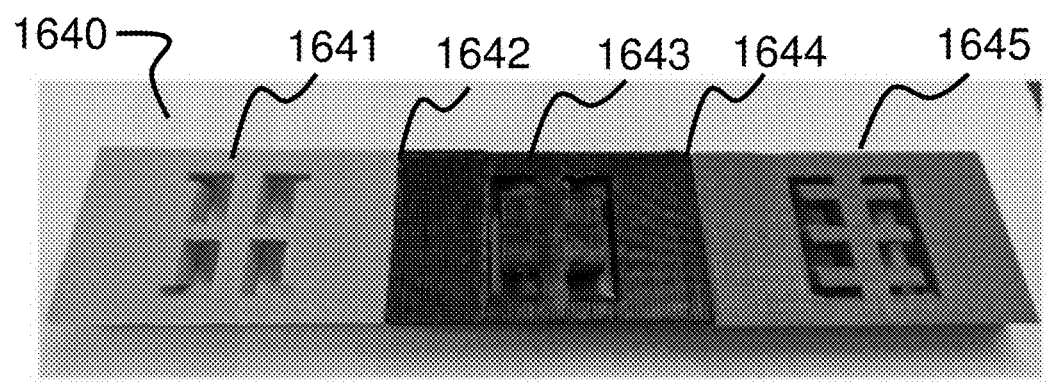
Figure 16F:
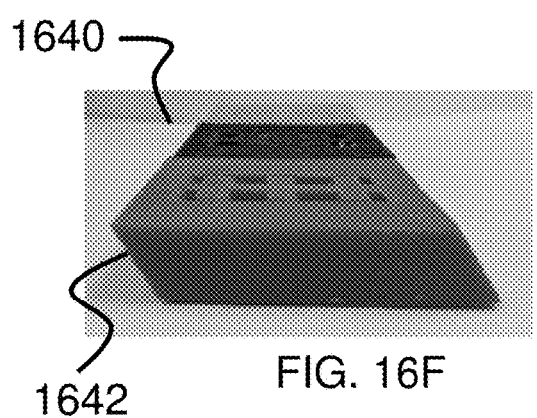
Figure 16G:
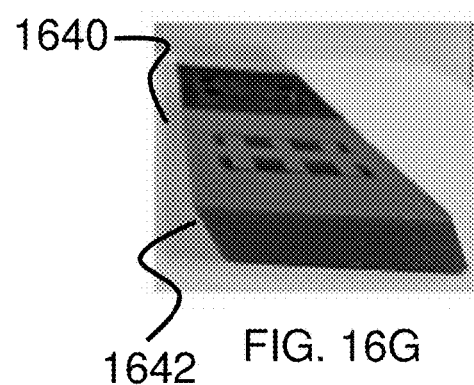

FIG. 16E is an example according to various embodiments, illustrating a photograph of a single part printed in three distinct colors using a multiplexed 3D printing system according to various embodiments. The discussion of FIG. 16A applies to this figure. For brevity, FIG. 16E shows a single part 1640 comprising a first section 1641 abutting and rigidly connected to a second section 1643 at a first intersection 1642, as well as a third section 1645 abutting and rigidly connected to the second section 1643 at a second intersection 1644. FIG. 16F is an example according to various embodiments, illustrating a photograph of side-view of the single part 1640 shown in FIG. 16E. The part 1640 includes an overhang 1642. FIG. 16G is an example according to various embodiments, illustrating a photograph of side-view of the single part 1640 shown in FIGS. 16E and 16F.

Example 2—Flexural Modulus

Figure 17:
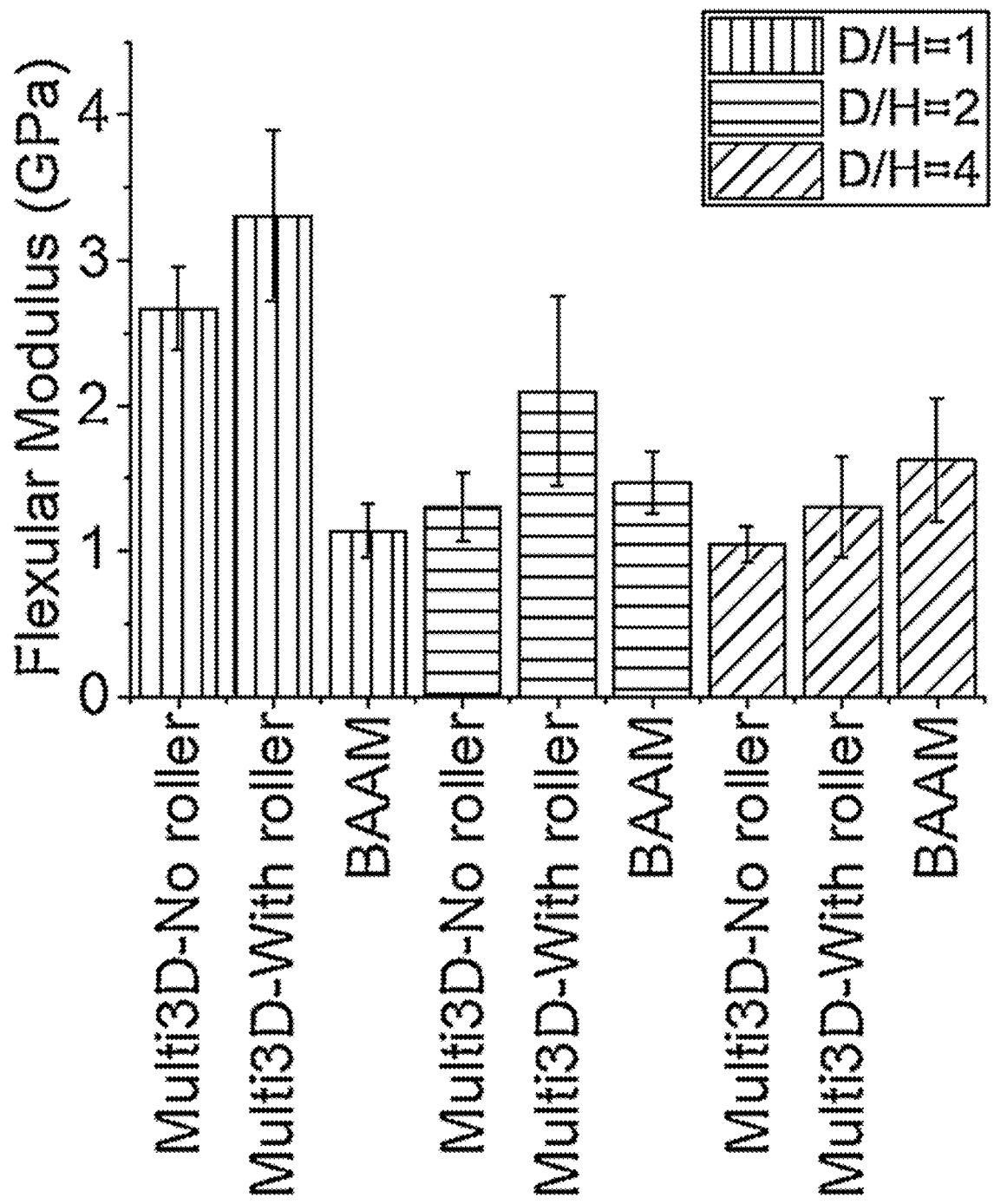
FIG. 17 is an example according to various embodiments, illustrating a chart showing flexural modulus measurements of structures fabricated with a multiplexed 3D printing system according to various embodiments in comparison to other structures.

FIG. 17 is an example according to various embodiments, illustrating a chart showing flexural modulus measurements of structures fabricated with a multiplexed 3D printing system according to various embodiments in comparison to other structures. As used herein, the term "flexural modulus" or "flexural stiffness" denotes the ability of a material to bend. It is a measure of a materials stiffness/resistance to bend when a force is applied perpendicular to the long edge of a sample—known as a three-point bend test. The tests were performed according to ASTM D790. The tests were performed at a constant nozzle diameter (D) and at various layer heights (H). The diameter (D) gives an indication of the width of the polymer deposited with each pass of the multiplexing printhead block. The layer height (H) is illustrated in FIG. 8.

The printing conditions were the same as described in Example 1. The nozzle size was fixed at 0.4 mm in diameter (D). The printed layer heights (H) were varied over 0.4 mm (D/H=1), 0.2 mm (D/H=2), and 0.1 mm (D/H=3). The D/H ratio has a fundamental power law correlation with the mechanical properties across a range of 3D printed polymer and polymer composite materials for any extrusion-based 3D printing process like BAAM or FFF. This allows us to compare mechanical properties at D/H=2, to that with BAAM which also uses the same D/H ratio and has published mechanical properties in the literature. The testing samples were prepared by printing a rectangle and milling out the appropriate sample for mechanical testing.

Example 3—Flexural Strength

Figure 18:
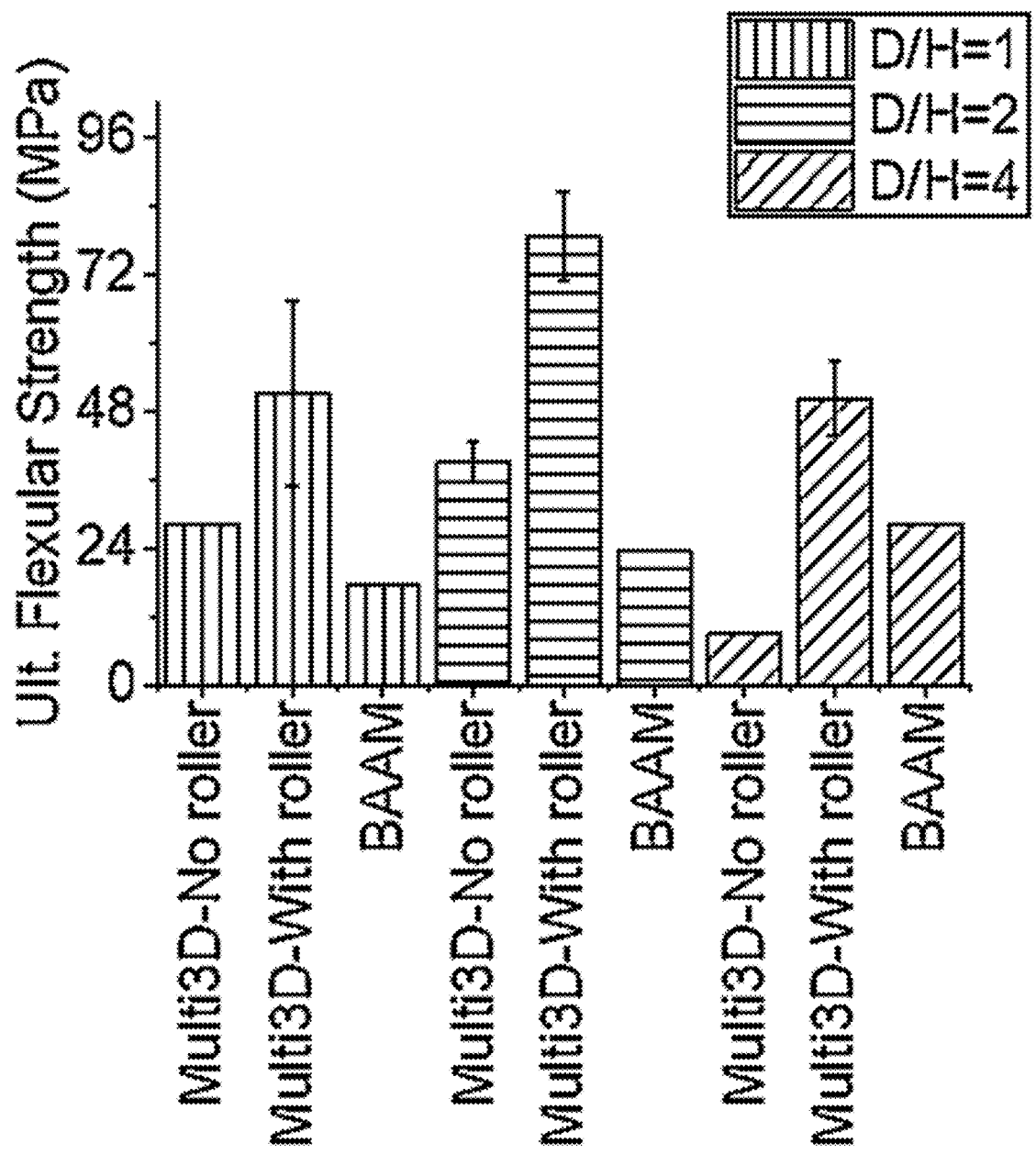
FIG. 18 is an example according to various embodiments, illustrating a chart showing flexural strength measurements of structures fabricated with multiplexed 3D printing system according to various embodiments in comparison to other structures.

FIG. 18 is an example according to various embodiments, illustrating a chart showing flexural strength measurements of structures fabricated with multiplexed 3D printing system according to various embodiments in comparison to other structures. Flexural strength, also known as modulus of rupture, or bend strength, or transverse rupture strength is a material property, defined as the stress in a material just before it yields in a flexure test. ASTM D790 is one of several tests designed to measure the flexural properties of plastics.

D is nozzle diameter (constant here) and H is the layer height (See FIG. 8 for schematic). BAAM corresponds to conventional Big Area Additive Manufacturing. The properties of BAAM are based on the fact that for a pure polymer (i.e., no carbon fiber inclusion) the maximum strength and stiffness of BAAM parts follow a known dependence on the D/H ratio, and the known maximum to minimum ratio of stiffness and strength in BAAM.

The printing conditions are described in Example 1. The nozzle size is fixed at 0.4 mm in Diameter (D). The printed layer heights (H) were varied over 0.4 mm (D/H=1), 0.2 mm (D/H=2), and 0.1 mm (D/H=3). The testing samples were prepared by printing a rectangle and milling out the appropriate sample for mechanical testing.

CONCLUSIONS

Good adhesion at the interface is ensured by the hot roller system according to various embodiments. Local compression of the material helps to reduce or to eliminate voids and to increase the interface strength. The corresponding change in material properties including the interface strength is shown in FIGS. 17 and 18. In the multiplexed 3d printing system according to various embodiments parts made without the hot rollers, the interface between subsections made by different nozzles is weaker than the bulk material. This is revealed when tensile testing of the sample is performed since the sample always breaks at the interface. This occurs because of the unique temperature history imposed by the distinctive toolpath used by the multiplexed 3d printing system according to various embodiments. These results show that the part strength achievable with the multiplexed 3d printing system according to various embodiments with hot rollers is greater than or similar to that in BAAM, while the stiffness is similar or greater than that in BAAM, depending on the ratio of the nozzle diameter to the layer height. Since the interface is the still the weakest section of the printed part, these changes in the material properties show that the stiffness and the strength of the interface are getting better. Effectively, these results show that tuning the layer height (still much smaller than BAAM though) along with using the hot roller system allows 2-3 times higher tensile strength and stiffness than that possible with BAAM today.

Example 4—Resilience to Nozzle Failure

Extrusion-based printing nozzles (in FFF or BAAM) can suffer from clogging or other failure issues that need the nozzle to be repaired or replaced. In an industrial setting this stops production and costs the enterprise money. Multiplexed 3D printing has unprecedented resilience to such nozzle failure. In the case of nozzle failure, a new toolpath can be easily configured with a slight modification of the method. First a new set of smallest fit rectangles is drawn with the now fewer available nozzles. The section that would have been printed by the defective nozzle is then assigned to an adjacent working nozzle. Thus, this working nozzle prints its own original section and the section that would have been printed by the defective nozzles. The rest of the toolpath generation is exactly the same. This eliminates the need to wait for the defective nozzle to be repaired, an undesirable issue that is endemic across nozzle-based polymer 3D printing processes.

Figure 19A:
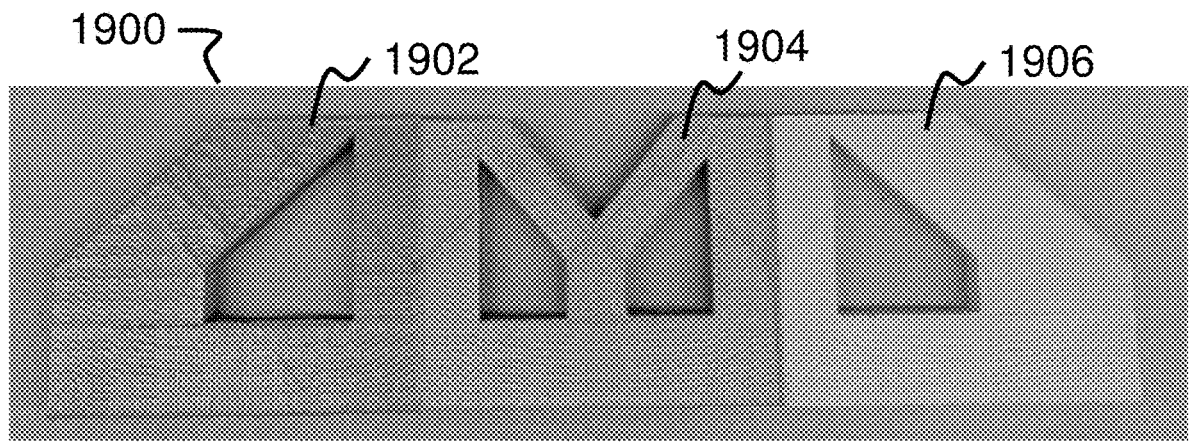
FIG. 19A is an example according to various embodiments, illustrating a part printed with three functioning nozzles.
Figure 19B:
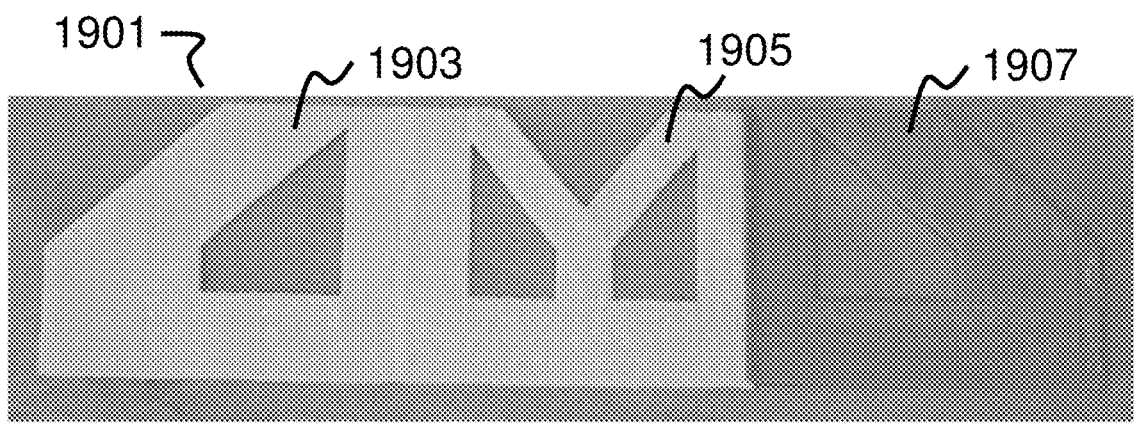
FIG. 19B is an example according to various embodiments, illustrating a part printed under conditions in which a first of three nozzles compensates for a malfunctioning second nozzle.

An example of this is demonstrated in FIGS. 19A, and 19B. FIG. 19A is an example according to various embodiments, illustrating a part printed with three functioning nozzles. FIG. 19B is an example according to various embodiments, illustrating a part printed under conditions in which a first of three nozzles compensates for a malfunctioning second nozzle. The part 1900 in FIG. 19A is printed with three distinct nozzles, as indicated by the difference in polymer colors for each of the three sections, including a first section 1902, a second section 1904, and a third section 1906. The part 1901 in FIG. 19B has the same shape as the part 1900 from FIG. 19A but was printed based on the assumption that the middle nozzle is defective. As a result, the left-most nozzle printed the middle section 1905 that would have been printed by the middle nozzle and prints the left section 1903 as would normally have printed if the middle nozzle was not defective. The third section 1907 is printed as in FIG. 19A by the third or right-most nozzle. This allows production to continue without having to wait for replacement or repair of the middle nozzle.

Example 5—Flexibility in Part Scale and Disjointed Printing

Figure 20:
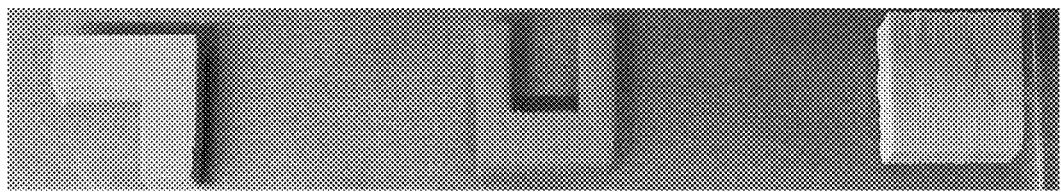
FIG. 20 is an example according to various embodiments, illustrating multiple distinct parts printed simultaneously with multiplexed 3D printing It should be understood that the various embodiments are not limited to the examples illustrated in the figures.

FIG. 20 is an example according to various embodiments, illustrating multiple distinct parts printed simultaneously with multiplexed 3D printing. Different colors correspond to different nozzles that print simultaneously. Another feature of multiplexed 3D printing is the ability to concurrently print multiple parts of various length scales and geometries within the same production run. This is in stark contrast to conventional methods like BAAM or FFF where only one part with a single length scale (big or small) and geometry (of one specific part) can be printed during a production run. This is a natural consequence of the scanning-based paths and multiplexed nozzles that are used according to various embodiments. Essentially, each extruder prints sections with individual geometries that are not connected by a junction, to get distinct parts. The toolpath/process planning do not change at all. This enables multiplexed 3D printers to print a variety of part numbers and sizes. This is a useful capability for manufacturers who can now buy a single multiplexed 3D printing machine to print small and big parts as dictated by market demands, instead of buying multiple separate printers for small high-resolution parts and for larger low-resolution parts.

REFERENCES

The following references are incorporated by reference herein in their entireties:
1. Ajinjeru, C., Kishore, V., Lindahl, J., Sudbury, Z., Hassen, A. A., Post, B., Love, L., Kunc, V. & Duty, C. The influence of dynamic rheological properties on carbon fiber-reinforced polyetherimide for large-scale extrusion-based additive manufacturing. The International Journal of Advanced Manufacturing Technology 99, 411-418 (2018).
2. Hassen, A. A., Lindahl, J., Chen, X., Post, B., Love, L. & Kunc, V. Additive manufacturing of composite tooling using high temperature thermoplastic materials 2648-2658 pages.
3. Compton, B. G., Post, B. K., Duty, C. E., Love, L. & Kunc, V. Thermal analysis of additive manufacturing of large-scale thermoplastic polymer composites. Additive Manufacturing 17, 77-86 (2017).
4. Kishore, V., Chen, X., Hassen, A. A., Lindahl, J., Kunc, V. & Duty, C. Post-process annealing of large-scale 3D printed polyphenylene sulfide composites. Additive Manufacturing 35, 101387 (2020).
5. Yeole, P., Hassen, A. A., Kim, S., Lindahl, J., Kunc, V., Franc, A. & Vaidya, U. Mechanical Characterization of High-Temperature Carbon Fiber-Polyphenylene Sulfide Composites for Large Area Extrusion Deposition Additive Manufacturing. Additive Manufacturing 34, 101255 (2020).
6. Kishore, V., Ajinjeru, C., Nycz, A., Post, B., Lindahl, J., Kunc, V. & Duty, C. Infrared preheating to improve interlayer strength of big area additive manufacturing (BAAM) components. Additive Manufacturing 14, 7-12 (2017).
7. Hassen, A. A., Springfield, R., Lindahl, J., Post, B., Love, L., Duty, C., Vaidya, U., Pipes, R. B. & Kunc, V. The durability of large-scale additive manufacturing composite molds. CAMX 2016, 26-29 (2016).
8. Schnittker, K., Arrieta, E., Jimenez, X., Espalin, D., Wicker, R. B. & Roberson, D. A. Integrating digital image correlation in mechanical testing for the materials characterization of big area additive manufacturing feedstock. Additive Manufacturing 26, 129-137 (2019).
9. Meraz Trejo, E., Jimenez, X., Billah, K. M. M., Seppala, J., Wicker, R. & Espalin, D. Compressive deformation analysis of large area pellet-fed material extrusion 3D printed parts in relation to in situ thermal imaging. Additive Manufacturing 33, 101099 (2020).
10. Nycz, A., Kishore, V., Lindahl, J., Duty, C., Carnal, C. & Kunc, V. Controlling substrate temperature with infrared heating to improve mechanical properties of large-scale printed parts. Additive Manufacturing 33, 101068 (2020).
11. Brackett, J., Yan, Y., Cauthen, D., Kishore, V., Lindahl, J., Smith, T., Sudbury, Z., Ning, H., Kunc, V. & Duty, C. Characterizing material transitions in large-scale Additive Manufacturing. Additive Manufacturing 38, 101750 (2021).
12. Roschli, A., Gaul, K. T., Boulger, A. M., Post, B. K., Chesser, P. C., Love, L. J., Blue, F. & Borish, M. Designing for Big Area Additive Manufacturing. Additive Manufacturing 25, 275-285 (2019).
13. Chesser, P., Post, B., Roschli, A., Carnal, C., Lind, R., Borish, M. & Love, L. Extrusion control for high quality printing on Big Area Additive Manufacturing (BAAM) systems. Additive Manufacturing 28, 445-455 (2019).
14. D'Amico, T. & Peterson, A. M. Bead parameterization of desktop and room-scale material extrusion additive manufacturing: How print speed and thermal properties affect heat transfer. Additive Manufacturing 34, 101239 (2020).
15. Duty, C. E., Kunc, V., Compton, B., Post, B., Erdman, D., Smith, R., Lind, R., Lloyd, P. & Love, L. Structure and mechanical behavior of Big Area Additive Manufacturing (BAAM) materials. Rapid Prototyping Journal 23, 181-189 (2017).
16. https://dyzedesign.com/typhoon-extruder/.
17. https://www.3dplatform.com/Products/Extruders/HFE-900-3D-Printer-Extruder.
18. Brenken, B., Barocio, E., Favaloro, A., Kunc, V. & Pipes, R. B. Fused filament fabrication of fiber-reinforced polymers: A review. Additive Manufacturing 21, 1-16 (2018).
19. Kuznetsov, V. E., Solonin, A. N., Urzhumtsev, O. D., Schilling, R. & Tavitov, A. G. Strength of PLA Components Fabricated with Fused Deposition Technology Using a Desktop 3D Printer as a Function of Geometrical Parameters of the Process. Polymers 10 (2018).
20. Shih, C.-C., Burnette, M., Staack, D., Wang, J. & Tai, B. L. Effects of cold plasma treatment on interlayer bonding strength in FFF process. Additive Manufacturing 25, 104-111 (2019).
21. Chang, B., Parandoush, P., Li, X., Ruan, S., Shen, C., Behnagh, R. A., Liu, Y. & Lin, D. Ultrafast printing of continuous fiber-reinforced thermoplastic composites with ultrahigh mechanical performance by ultrasonic-assisted laminated object manufacturing. Polymer Composites 41, 4706-4715 (2020).
22. Tofangchi, A., Han, P., Izquierdo, J., Iyengar, A. & Hsu, K. Effect of Ultrasonic Vibration on Interlayer Adhesion in Fused Filament Fabrication 3D Printed ABS. Polymers 11 (2019).
23. U.S. Ser. No. 10/710,353-B2—Systems and Methods for Laser Preheating in Connection with Fused Deposition Modeling.
24. Duty, C. E., Kunc, V., Compton, B., Post, B., Erdman, D., Smith, R., Lind, R., Lloyd, P. & Love, L. Structure and mechanical behavior of Big Area Additive Manufacturing (BAAM) materials. Rapid Prototyping Journal 23, 181-189 (2017).
25. Brenken, B., Barocio, E., Favaloro, A., Kunc, V. & Pipes, R. B. Fused filament fabrication of fiber-reinforced polymers: A review. Additive Manufacturing 21, 1-16 (2018).
26. Kuznetsov, V. E., Solonin, A. N., Urzhumtsev, O. D., Schilling, R. & Tavitov, A. G. Strength of PLA Components Fabricated with Fused Deposition Technology Using a Desktop 3D Printer as a Function of Geometrical Parameters of the Process. Polymers 10 (2018).

What is claimed is:
1. A multiplexed three-dimensional printing system comprising:
a printhead block moveable in three dimensions, the printhead block comprising a plurality of extruders, wherein each of the plurality of extruders is individually switchable between a deposition state and a retraction state, wherein the deposition state deposits a printing material, and wherein the retraction state retracts a filament of the printing material to prevent deposition of the printing material; and a controller configured to determine a smallest fit rectangle that bounds a two-dimensional slice of the object, to determine the toolpath within the smallest fit rectangle, and to determine a plurality of points within the smallest fit rectangle for the plurality of extruders at which switches between the deposition state and the retraction state should occur to print the object.

2. The system according to claim 1, wherein at least one extruder of the plurality of extruders comprises a filament gear, and
wherein the filament gear is operable in a forward direction to feed the filament of the printing material out of the at least one extruder and in a reverse direction to retract the filament within the at least one extruder.

3. The system according to claim 1, further comprising a gantry operatively associated with the printhead block and configured to selectively move the printhead block along at least one of an X-axis, a Y-axis, and a Z-axis.

4. The system according to claim 1, further comprising a plurality of rollers, wherein each of the plurality of rollers is associated with one of the plurality of extruders and positioned to apply pressure to the printing material deposited therefrom.

5. The system according to claim 4, wherein a nozzle of a respective extruder of the plurality of extruders is disposed between a first roller of the plurality of rollers and a second roller of the plurality of rollers, and wherein the nozzle, the first roller, and the second roller are colinear.

6. The system according to claim 4, wherein at least one of the plurality of rollers is heated.

7. The system according to claim 4, wherein at least one of the plurality of rollers comprises a spring-biased roller ball.

8. A method for multiplexed three-dimensional printing an object via a printhead block moveable in three dimensions, the printhead block comprising a plurality of extruders, wherein each of the plurality of extruders is individually switchable between a deposition state and a retraction state, wherein the deposition state deposits a printing material, and wherein the retraction state retracts a filament of the printing material to prevent deposition of the printing material, the method comprising:
moving the printhead block along a toolpath;
individually switching the plurality of extruders between the deposition state and the retraction state; and
determining a smallest fit rectangle that bounds a two-dimensional slice of the object, determining the toolpath within the smallest fit rectangle, and determining a plurality of points within the smallest fit rectangle for the plurality of extruders at which switches between the deposition state and the retraction state should occur to print the object.

9. The method according to claim 8, further comprising:
depositing the printing material to form a deposition of the printing material, and
compressing the deposition.

10. The method according to claim 8, further comprising retracting the filament of the printing material during the retraction state.

11. The method according to claim 8, further comprising selectively moving the printhead block within a gantry that is operatively associated with the printhead block and configured to move the printhead block along at least one of an X-axis, a Y-axis, and a Z-axis.

12. The method according to claim 8, further comprising calibrating each of the plurality of extruders based on imaging data of printing material deposited by each of the plurality of extruders.

13. The method according to claim 12, wherein the calibration comprises an adjustment of a deposition rate of the printing material.

14. A system, comprising:
a multiplexed three-dimensional printing system comprising a printhead block moveable in three dimensions, the printhead block comprising a plurality of extruders, wherein each of the plurality of extruders is individually switchable between a deposition state and a retraction state, wherein the deposition state deposits a printing material, and wherein the retraction state retracts a filament of the printing material to prevent deposition of the printing material; and
a controller configured to control movement of the printhead block and to control individually switching the plurality of extruders between the deposition state and the retraction state,
wherein the controller is further configured to determine a smallest fit rectangle that bounds a two-dimensional slice of the object, to determine the toolpath within the smallest fit rectangle, and to determine a plurality of points within the smallest fit rectangle for the plurality of extruders at which switches between the deposition state and the retraction state should occur to print the object.

15. The system according to claim 14, wherein at least one extruder of the plurality of extruders comprises a filament gear configured to selectively feed or retract the filament of the printing material, and
wherein the controller is further configured to selectively control the filament gear to feed or retract the filament.

16. The system according to claim 14, wherein the multiplexed three-dimensional printing system further comprises a gantry operatively associated with the printhead block and configured to selectively move the printhead block along at least one of an X-axis, a Y-axis, and a Z-axis,
wherein the controller is further configured to control the gantry to selectively move the printhead block.

17. The system according to claim 14, wherein the system further comprises a camera system communicatively coupled to the controller and positioned relative to the printhead block to acquire images of printing material deposited by the plurality of extruders,
wherein the controller is configured to control the camera to selectively acquire the images of the printing material deposited by the plurality of extruders.

18. The system according to claim 17, wherein the controller is further configured to develop a toolpath for the printhead block based at least in part on the images.

19. The system according to claim 14, wherein the controller is further configured to allow for one or more of the plurality of extruders to compensate for one of the plurality of extruders that is in a malfunctioning state by depositing the printing material that would otherwise be deposited by the one of the plurality of extruders that is in the malfunctioning state.

* * * * *